(12) United States Patent
Ogawa et al.

(10) Patent No.: US 7,314,041 B2
(45) Date of Patent: Jan. 1, 2008

(54) EGR CONTROL SYSTEM FOR INTERNAL COMBUSTION ENGINE

(75) Inventors: Ken Ogawa, Saitama-ken (JP); Toru Kitamura, Saitama-ken (JP); Atsushi Umemoto, Saitama-ken (JP); Toshinari Shinohara, Saitama-ken (JP); Mitsuru Sugimoto, Saitama-ken (JP); Tetsuaki Nakano, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/523,671

(22) Filed: Sep. 20, 2006

(65) Prior Publication Data

US 2007/0074707 A1    Apr. 5, 2007

(30) Foreign Application Priority Data

Sep. 30, 2005  (JP)  ............................. 2005/288057
Sep. 30, 2005  (JP)  ............................. 2005/288060
Sep. 30, 2005  (JP)  ............................. 2005/288062

(51) Int. Cl.
*F02M 25/07*  (2006.01)
*F02B 47/08*  (2006.01)
*F01L 1/34*   (2006.01)
*G06F 19/00*  (2006.01)

(52) U.S. Cl. ........................... 123/568.14; 123/568.21; 123/90.16; 701/108

(58) Field of Classification Search .. 123/90.15–90.18, 123/568.11–568.18, 568.21, 58.8, 316; 701/108; 60/605.2
See application file for complete search history.

(56) References Cited

U.S. PATENT DOCUMENTS

| | | | | |
|---|---|---|---|---|
| 4,173,205 A | * | 11/1979 | Toelle .................... | 123/568.22 |
| 6,161,519 A | * | 12/2000 | Kimura et al. ......... | 123/568.14 |
| 6,227,182 B1 | * | 5/2001 | Muraki et al. ......... | 123/568.21 |
| 6,748,936 B2 | * | 6/2004 | Kinomura et al. ..... | 123/568.22 |
| 7,000,380 B2 | * | 2/2006 | Tokuyasu et al. ...... | 123/568.14 |
| 7,066,160 B2 | * | 6/2006 | Matsumoto ............ | 123/568.16 |
| 7,195,006 B2 | * | 3/2007 | Khair et al. ........... | 123/568.12 |
| 2006/0070605 A1 | * | 4/2006 | Akihisa et al. ........ | 123/568.21 |
| 2007/0119434 A1 | * | 5/2007 | Minegishi et al. ..... | 123/568.21 |

* cited by examiner

*Primary Examiner*—Willis R. Wolfe, Jr.
(74) *Attorney, Agent, or Firm*—Arent Fox LLP

(57) ABSTRACT

An EGR control system that is capable of controlling the amount of recirculation of high-temperature and low-temperature recirculated gases, with high accuracy, to thereby improve the control accuracy of in-cylinder temperature. An ECU of an ERG control system calculates a fresh intake air ratio, and sets a target value of the fresh intake air ratio. The ECU calculates a feedback correction coefficient for converging the fresh intake air ratio to the target value, with an I-PD control algorithm, and sets an external EGR ratio and an internal EGR ratio. The ECU controls the EGR amount whose ratio is the larger, according to the larger one of the two ratios and the feedback correction coefficient, and controls the EGR amount whose ratio is the smaller, according to the smaller of the ratios and the learned value thereof.

8 Claims, 23 Drawing Sheets

FIG. 18

| NE<br>PMCMD | NE1 ········· NEj |
|---|---|
| PMCMD1 | KEGRCMD11 ········ KEGRCMD1j |
| ⋮ | ⋮ |
| PMCMDi | KEGRCMDi1 ········ KEGRCMDij |

FIG. 19

| NE<br>PMCMD | NE1 ········· NEj |
|---|---|
| PMCMD1 | EGRDIVIN11 ········ EGRDIVIN1j |
| ⋮ | ⋮ |
| PMCMDi | EGRDIVINi1 ········ EGRDIVINij |

| NE\PMCMD | NE1 | ⋯⋯⋯⋯ | NEj |
|---|---|---|---|
| PMCMD1 | KCMDMAP11 | ⋯⋯⋯⋯ | KCMDMAP1j |
| ⋮ | ⋮ | ⋱ | ⋮ |
| PMCMDi | KCMDMAPi1 | ⋯⋯⋯⋯ | KCMDMAPij |

FIG. 23

| NE \ KEGRMAPIN | KEGRMAPIN1 ·········· KEGRMAPINj |
|---|---|
| NE1 | SAAEXCMD11 ·········· SAAEXCMD1j |
| ⋮ | ⋮      ⋮      ⋮ |
| NEi | SAAEXCMDi1 ·········· SAAEXCMDij |

FIG. 24

| NE \ KEGRMAPIN | KEGRMAPIN1 ·········· KEGRMAPINj |
|---|---|
| NE1 | CAEXCMD11 ·········· CAEXCMD1j |
| ⋮ | ⋮      ⋮      ⋮ |
| NEi | CAEXCMDi1 ·········· CAEXCMDij |

FIG. 25

| NE \ KEGRMAPIN | KEGRMAPIN1 · · · · · · · · · KEGRMAPINj |
|---|---|
| NE1 | CAINCMD11 · · · · · · · · · CAINCMD1j |
| ⋮ | ⋮              ⋮ |
| NEi | CAINCMDi1 · · · · · · · · · CAINCMDij |

FIG. 26

| HPBGA \ KEGRMAPEX | KEGRMAPEX1 · · · · · · · · · KEGRMAPEXj |
|---|---|
| HPBGA1 | LCMD11 · · · · · · · · · LCMD1j |
| ⋮ | ⋮              ⋮ |
| HPBGAi | LCMDi1 · · · · · · · · · LCMDij |

EGR CONTROL SYSTEM FOR INTERNAL COMBUSTION ENGINE

BACKGROUND OF THE INVENTION

1. Field of the Invention

The present invention relates to an EGR control system for an internal combustion engine, for controlling high-temperature and low-temperature recirculated gases, particularly to an EGR control system for an internal combustion engine, for controlling internal EGR in which combustion gases generated by combustion are caused to remain in a cylinder, and more particularly to an EGR control system for an internal combustion engine, for controlling the internal EGR by changing lift of exhaust valves by an exhaust valve lift mechanism.

2. Description of the Related Art

Conventionally, an EGR control system for an internal combustion engine, of the above-mentioned kind, has been disclosed e.g. in the publication of Japanese Patent Publication No. 3305416 (first prior art). This engine is of a spark ignition type, and includes a low-temperature EGR device and a high-temperature EGR device. The low-temperature EGR device recirculates relatively low-temperature exhaust gases flowing in an exhaust passage to an intake passage side. The low-temperature EGR device includes a low-temperature EGR passage and a low-temperature EGR control valve. The low-temperature EGR passage connects between an intake passage and the exhaust passage, and in an intermediate portion of the low-temperature EGR passage, there is disposed a low-temperature EGR control valve. The degree of opening of the low-temperature EGR passage is changed, as desired, by the low-temperature EGR control valve, whereby the amount of exhaust gases recirculated through the low-temperature EGR passage (hereinafter referred to as "the low-temperature EGR amount") is changed.

On the other hand, the high-temperature EGR device recirculates higher-temperature exhaust gases than the exhaust gases recirculated by the low-temperature EGR device, into a cylinder. The high-temperature EGR device includes a high-temperature EGR passage and a high-temperature EGR control valve. The high-temperature EGR passage is formed in a cylinder head of the engine. The high-temperature EGR passage has one end thereof opening into a combustion chamber and the other end thereof opening into an exhaust port, and in an intermediate portion of the high-temperature EGR passage, there is disposed a high-temperature EGR control valve. The degree of opening of the high-temperature EGR passage is changed, as desired, by the high-temperature EGR control valve, whereby the amount of exhaust gases recirculated through the high-temperature EGR passage (hereinafter referred to as "the high-temperature EGR amount") is changed.

In this EGR control system, the respective ratios of the high-temperature EGR amount and the low-temperature EGR amount to a total EGR amount are determined by searching a map according to the load of the engine. Then, the high-temperature EGR control valve and the low-temperature EGR control valve are duty-controlled based on these ratios, whereby the high-temperature EGR amount and the low-temperature EGR amount are controlled.

Further, a conventional EGR control system for an internal combustion engine, for controlling internal EGR has been disclosed e.g. in Japanese Laid-Open Patent Publication (Kokai) No. 2004-251183 (second prior art). This EGR control system is provided with variable valve actuating mechanisms on respective intake and exhaust sides for changing an intake cam phase and an exhaust cam phase, and with these variable valve actuating mechanisms, changes the opening and closing timings of intake valves and exhaust valves to change the valve overlap of the intake and exhaust valves, whereby the internal EGR amount is controlled.

More specifically, an actual overlap area as the area of an actual valve overlap of intake and exhaust valves is calculated, and the variable valve mechanisms are controlled such that the valve overlap area of the intake and exhaust valves becomes equal to a value obtained by multiplying the ratio of a target internal EGR amount to an actual internal EGR amount and the actual valve overlap area by each other.

Further, there has been known another conventional EGR control system for an internal combustion engine, as disclosed in Japanese Laid-Open Patent Publication (Kokai) No. H05-18324 (third prior art). This EGR control system recirculates part of exhaust gases exhausted from the engine as an EGR gas from the exhaust pipe to the intake pipe via an EGR passage, and an EGR control valve is disposed in an intermediate portion of the EGR passage, for controlling the EGR rate. Further, an oxygen concentration sensor is disposed in the intake pipe at a location downstream of a portion of the intake pipe into which the EGR gas is recirculated. The oxygen concentration sensor detects a concentration of oxygen in intake air mixed with the EGR gas, and a predetermined map is searched according to the detected oxygen concentration, to thereby calculate an actual EGR rate as an EGR rate which is actually applied.

Further, the engine speed and intake manifold pressure are detected, and a target EGR rate is calculated based on the detected values thereof. At the same time, an EGR basic control variable is calculated according to the target EGR rate. Then, a EGR correction value is calculated such that the difference between the calculated target EGR rate and the actual EGR rate is reduced to zero, and the EGR control valve is controlled based on an EGR control value obtained by adding the EGR correction value to the EGR basic control variable, whereby the actual EGR rate is controlled to the target EGR rate.

According to the first prior art, the high-temperature EGR amount and the low-temperature EGR amount are controlled simply by determining the ratios of the high-temperature EGR amount and the low-temperature EGR amount by searching a map, and then duty-controlling the high-temperature EGR control valve and the low-temperature EGR control valve based on these ratios. Therefore, control accuracy in EGR control is relatively low, which degrades accuracy in control of in-cylinder temperature as well. For these reasons, there is a fear that fuel economy, drivability, and exhaust emission might be all degraded. Further, the conventional EGR control system cannot be applied to an engine, such as a compression ignition combustion engine, which requires highly accurate control of in-cylinder temperature in combustion of a mixture.

According to the second prior art, the internal EGR amount is controlled by changing the intake and exhaust cam phases using the variable valve actuating mechanisms, to thereby change the valve overlap of the intake and exhaust valves. Therefore, in changing the internal EGR amount, it is required to relatively largely change the intake and exhaust cam phases, and it takes time before the intake and exhaust cam phases are actually changed in response to associated control signals after delivery of the signals to the variable valve actuating mechanisms, i.e. the variable valve actuating mechanisms suffer from response delay, so that the control of the internal EGR amount is low in responsiveness, which makes it impossible to promptly control the internal EGR amount to a desired EGR amount.

Further, to control the internal EGR amount, it is necessary to calculate the overlap area between respective non-linear valve lift curves of the intake and exhaust valves, and for accurate calculation of the overlap area, it is required to execute complicated computing operations, such as integral operations, which increases computation load. On the other hand, to lessen the computation load, if the computation of the actual valve overlap area is executed in a simplified manner using e.g. an approximate expression, the computation accuracy is lowered which prevents the internal EGR amount from being accurately controlled.

According to the third prior art, the actual EGR rate is calculated based on an oxygen concentration in the intake pipe detected by the oxygen concentration sensor at the location downstream of the portion of the intake pipe into which the EGR gas is recirculated. In general, however, the oxygen concentration sensor has a characteristic that the resolution of the detected concentration is lowered as the oxygen concentration is higher, and hence the detection accuracy of the sensor is lowered. Therefore, when the EGR rate is low, the actual EGR rate cannot be detected with accuracy, so that the actual EGR rate cannot be accurately controlled to the target EGR rate. Further, it is required to provide the oxygen concentration sensor in the intake pipe only for determining the actual EGR rate, which is disadvantageous in costs.

Further, as is apparent from the above-described method, the EGR control system is effective in performing what is called external EGR in which exhaust gases are recirculated into the intake pipe. However, in performing what is called internal EGR in which part of combustion gases are caused to remain in the combustion chamber without being exhausted therefrom, it is impossible to accurately calculate an internal EGR rate which is a ratio of an amount of combustion gases to a total amount of gases existing in the combustion chamber.

SUMMARY OF THE INVENTION

It is a first object of the present invention to provide an EGR control system that is capable of controlling the amount of recirculation of high-temperature and low-temperature recirculated gases, with high accuracy, to thereby improve the control accuracy of in-cylinder temperature.

It is a second object of the present invention to provide an EGR control system for an internal combustion engine, which is capable of reducing computation load and controlling internal EGR promptly with accuracy depending on operating conditions of the engine.

It is a third object of the present invention to provide an EGR control system for an internal combustion engine, which is capable of accurately calculating the EGR rate in performing internal EGR even when the EGR rate is low, without additional provision of a dedicated device, thereby properly performing the EGR control.

To attain the first object, in a first aspect of the present invention, there is provided an EGR control system for an internal combustion engine including at least one cylinder, comprising a low-temperature gas recirculation device that recirculates exhaust gases emitted from the cylinder into the cylinder, as a low-temperature gas, and is capable of changing a recirculation amount of the low-temperature gas, a high-temperature gas recirculation device that executes at least one of an operation for causing combustion gases generated in the cylinder to remain in the cylinder as a high-temperature gas higher in temperature than the low-temperature gas and an operation for recirculating the high-temperature gas into the cylinder, as an operation for recirculating the high-temperature gas, and is capable of changing a recirculation amount of the high-temperature gas, EGR rate parameter-calculating means for calculating an EGR rate parameter indicative of a ratio of a total recirculated gas amount which is a sum of respective amounts of the low-temperature gas and the high-temperature gas which are recirculated into the cylinder, to a total gas amount which is a sum of the total recirculated gas amount and an amount of fresh air drawn into the cylinder, according to a first operating condition parameter indicative of an operating condition of the engine, target value-setting means for setting a target value of the EGR rate parameter according to a second operating condition parameter indicative of an operating condition of the engine, feedback correction value-calculating means for calculating a feedback correction value for causing the EGR rate parameter to converge to the set target value, with a predetermined feedback control algorithm, gas amount ratio-setting means for setting a ratio of an amount of the low-temperature gas to be recirculated by the low-temperature gas recirculation device to the total recirculated gas amount, and a ratio of an amount of the high-temperature gas to be recirculated by the high-temperature gas-recirculation device to the total recirculated gas amount, according to a third operating condition parameter indicative of an operation condition of the engine, and control means for controlling one of the low-temperature gas recirculation device and the high-temperature gas recirculation device, which recirculates one of the low-temperature gas and the high-temperature gas, of which the set ratio of the amount is larger, according to a larger one of the set ratio of the amount of the low-temperature gas and the set ratio of the amount of the high-temperature gas, and the feedback correction value.

With the configuration of the EGR control system according to the first aspect of the present invention, the low-temperature gas recirculation device recirculates exhaust gases exhausted from a cylinder of the engine into the cylinder as the low-temperature gas, and changes the recirculation amount of the low-temperature gas, and the high-temperature gas recirculation device executes an operation for causing combustion gases generated in the cylinder to remain in the cylinder as a high-temperature gas higher in temperature than the low-temperature gas and/or an operation for recirculating the high-temperature gas into the cylinder, and changes the recirculation amount of the high-temperature gas. One of the low-temperature gas recirculation device and the high-temperature gas recirculation device which recirculates one of the high-temperature gas and the low-temperature gas, of which the ratio of the recirculation amount is larger, is controlled according to the determined ratio of the amount of the gas and the feedback correction value. The feedback correction value is for causing the EGR rate parameter indicative of a ratio of the total recirculated gas amount to the total gas amount to its target value, and is calculated with a predetermined feedback control algorithm. Therefore, by controlling the one recirculation device that recirculates the larger amount of gas according to the feedback correction value thus calculated and the ratio of the gas amount, it is possible to feedback-control the larger one of the low-temperature gas amount and the high-temperature gas amount such that the EGR rate parameter converges to its target value. That is, it is possible to feedback-control the actual total recirculated gas amount such that it promptly converges to a proper value. As a result, control accuracy in EGR control can be further improved compared with the conventional EGR control in which the low-temperature gas amount and the high-temperature gas amount are both duty-controlled.

Further, the EGR rate parameter is calculated according to the first operating condition parameter indicative of an operation of the engine; the target value of the EGR rate parameter is set according to a second operating condition parameter indicative of an operating condition of the engine; and respective ratios of the amounts of the low-temperature gas and the high-temperature gas that are recirculated by the low-temperature gas recirculation device and the high-temperature gas recirculation device, respectively, to the total recirculated gas amount are set according to the third operating condition parameter indicative of an operating condition of the engine. Therefore, even when the operating condition of the engine has changed, these values can be calculated as proper values according to the change in the operating condition of the engine. As a result, control accuracy in EGR control can be further improved to thereby further enhance accuracy in the control of in-cylinder temperature. From the above, fuel economy, drivability, and exhaust emission can be all improved, and this EGR control system can be applied to an internal combustion engine requiring highly accurate control of in-cylinder temperature, such as a compression ignition combustion engine which burns a mixture by compression self-ignition.

Preferably, the EGR control system further comprises learned value-calculating means for calculating a learned value of the feedback correction value for the low-temperature gas, when the ratio of the amount of the low-temperature gas is larger than that of the amount of the high-temperature gas and at the same time not smaller than a first predetermined value, and a learned value of the feedback correction value for the high-temperature gas, when the ratio of the amount of the high-temperature gas is larger than that of the amount of the low-temperature gas and at the same time not smaller than a second predetermined value, and the control means controls the other of the low-temperature gas recirculation device and the high-temperature gas recirculation device, according to the other of the ratio of the amount of the low-temperature gas and that of the amount of the high-temperature gas, and the learned value for the other gas.

With the configuration of the preferred embodiment, when the ratio of the amount of the low-temperature gas is larger than that of the amount of the high-temperature gas and at the same time not smaller than a first predetermined value, the learned value of the feedback correction coefficient for the low-temperature gas is calculated, whereas when the ratio of the amount of the high-temperature gas is larger than that of the amount of the low-temperature gas and at the same time not smaller than a second predetermined value, the learned value of the feedback correction coefficient for the high-temperature gas is calculated. Further, the other of the low-temperature gas recirculation device and the high-temperature gas recirculation device is controlled according to the other of the ratio of the amount of the low-temperature gas and that of the amount of the high-temperature gas, and the learned value for the other gas. That is, the gas recirculation device which recirculates the other gas of which the ratio of the amount is smaller is controlled in a feedforward manner using the learned value of the feedback correction value for the other gas, and the learned value is calculated when the ratio of the amount of the other gas is large and larger than the predetermined value. Therefore, it is possible to prevent the amount of the other gas recirculated by the other gas recirculation device from becoming an improper value. Accordingly, it is possible to cause the EGR rate parameter to promptly converge to its target value while preventing the control of the other gas recirculation device that recirculates the gas of which the ratio of the amount is the smaller from interfering with the feedback control of the one gas recirculation device that recirculates one gas of which the ratio of the amount is the larger, whereby the control accuracy in the EGR control can be further improved.

To attain the second object, in a second aspect of the present invention, there is provided an EGR control system for an internal combustion engine including at least one cylinder and at least one exhaust valve associated therewith, the EGR control system controlling internal EGR in which combustion gases generated by combustion are caused to remain in the cylinder, comprising a variable exhaust lift mechanism that is provided with an actuator mechanically connected to the exhaust valve, and is capable of continuously changing lift of the exhaust valve by changing an operation amount of the actuator, operating condition-detecting means for detecting an operating condition of the engine, internal EGR target value-setting means for setting a target value of an internal EGR rate parameter indicative of a ratio of an amount of internal EGR to a total amount of gases existing in the cylinder, as an internal EGR target value, depending on the detected operating condition of the engine, target operation amount-setting means for setting a target operation amount of the actuator, according to the set internal EGR target value, and EGR control means for controlling the internal EGR by controlling the variable exhaust lift mechanism, based on the set target operation amount.

With the configuration of the EGR control system according to the second aspect of the present invention, the EGR control system includes a variable exhaust lift mechanism having an actuator mechanically connected to the exhaust valve, and continuously changes the lift of the exhaust valve by changing an operation amount of the actuator. Further, the internal EGR target value-setting means sets a target value of an internal EGR rate parameter indicative of a ratio of the amount of internal EGR to the total amount of gases existing in the cylinder, as an internal EGR target value, depending on the detected operating condition of the engine, and the target operation amount-setting means sets a target operation amount of the actuator, according to the set internal EGR target value. Then, EGR control means controls the internal EGR by controlling the variable exhaust lift mechanism, based on the set target operation amount.

As described above, in the EGR control system, the internal EGR is controlled by changing the lift of the exhaust valve by the variable exhaust lift mechanism. Therefore, as distinct from the conventional method of changing the valve overlap of the exhaust valve by changing the intake and exhaust cam phases, it is possible to change the internal EGR amount largely by a relatively small amount of change in the lift of the exhaust valve. Further, since the lift of the exhaust valves is directly and continuously changed by the actuator mechanically connected to the exhaust valve, it is possible to promptly and accurately control the internal EGR amount.

Further, the internal EGR target value as the target value of the internal EGR rate parameter is set depending on the operating condition of the engine, and the operation amount of the actuator is controlled based on a target operation amount of the actuator set according to the internal EGR target value. Therefore, it is possible to properly control the internal EGR amount depending on the operating condition of the engine. Further, since it becomes unnecessary to execute the conventional calculation of the valve overlap area, the computation load can be reduced.

Preferably, the engine includes an exhaust cam for driving the exhaust valve, and a crankshaft, and the EGR control system further comprises a variable exhaust cam phase mechanism that is capable of changing opening and closing timings of the exhaust valve by changing an exhaust cam phase as a phase of the exhaust cam with respect to the crankshaft, and target exhaust cam phase-setting means for setting a target exhaust cam phase according to the internal EGR target value, and the EGR control means controls the internal EGR not only by controlling the variable exhaust lift mechanism, but also by controlling the variable exhaust cam phase mechanism based on the set target exhaust cam phase.

With the configuration of the preferred embodiment, the EGR control system comprises a variable exhaust cam phase mechanism that changes opening and closing timings of the exhaust valve by changing an exhaust cam phase as a phase of the exhaust cam with respect to the crankshaft. Further, the target exhaust cam phase-setting means sets a target exhaust cam phase according to the internal EGR target value, and the EGR control means controls the internal EGR not only by controlling the variable exhaust lift mechanism, but also by controlling the variable exhaust cam phase mechanism based on the set target exhaust cam phase. When the internal EGR is controlled by the opening and closing timings of the exhaust valve, the amount of change in the internal EGR amount responsive to changes in the opening and closing timings is relatively small, and hence the internal EGR amount can be increased or decreased in a fine-grained manner.

Therefore, in addition to the control of the lift of the exhaust valve by the variable exhaust lift mechanism, by concurrently executing the control of the opening and closing timings of the exhaust valves by the variable exhaust cam phase mechanism, it becomes possible to control the internal EGR amount in a fine-grained manner, whereby the internal EGR amount can be promptly and more accurately controlled. Further, the control range of the internal EGR amount can be expanded compared with the cases where only the variable exhaust lift mechanism is controlled, whereby it is possible to increase the internal EGR amount as required.

Preferably, the engine includes at least one intake valve associated with the at least one cylinder, an intake cam for driving the exhaust valve, and a crankshaft, and the EGR control system further comprises a variable intake cam phase mechanism that is capable of changing opening and closing timings of the intake valve by changing an intake cam phase as a phase of the intake cam with respect to the crankshaft, and target intake cam phase-setting means for setting a target intake cam phase according to the internal EGR target value, the EGR control means controlling the internal EGR not only by controlling the variable exhaust lift mechanism, but also by controlling the variable intake cam phase mechanism based on the set target intake cam phase.

With the configuration of the preferred embodiment, the EGR control system further comprises a variable intake cam phase mechanism that changes opening and closing timings of the intake valve by changing an intake cam phase as a phase of the intake cam with respect to the crankshaft. Further, the target intake cam phase-setting means sets a target intake cam phase according to the internal EGR target value, and the EGR control means controls the internal EGR not only by controlling the variable exhaust lift mechanism, but also by controlling the variable intake cam phase mechanism based on the set target intake cam phase. Depending on the operating condition of the engine, the internal EGR amount can become short when only the control of the lift of the exhaust valve by the variable exhaust lift mechanism is performed. With the above-described configuration, in addition to the control by the variable exhaust lift mechanism, by concurrently executing the control of the opening and closing timings of the intake valves by the variable intake cam phase mechanism, it is possible to make up for shortage of the internal EGR amount to thereby secure a required internal EGR amount. Further, similarly to the case of the variable exhaust cam phase mechanism, it is possible to control the internal EGR amount in a finer-grained manner, whereby the internal EGR amount can be promptly and more accurately controlled.

To attain the third object, in a third aspect of the present invention, there is provided an EGR control system for an internal combustion engine including an intake pipe, at least one cylinder, at least one exhaust valve associated therewith, and a variable exhaust lift mechanism for changing lift of the exhaust valve, the EGR control system controlling internal EGR in which combustion gases are caused to remain in the cylinder, by changing the lift of the exhaust valve by the variable exhaust lift mechanism, comprising a fresh air flow rate sensor provided in the intake pipe, for detecting a flow rate of fresh air flowing through the intake pipe, first fresh intake air amount-calculating means for calculating an amount of fresh intake air drawn into the cylinder, based on the detected flow rate of fresh air, as a first fresh intake air amount, rotational speed-detecting means for detecting rotational speed of the engine, intake pipe pressure-detecting means for detecting pressure in the intake pipe, second fresh intake air amount-calculating means for calculating an amount of fresh air estimated to be drawn into the cylinder, based on the detected rotational speed of the engine and the detected intake pipe pressure, as a second fresh intake air amount, when the variable exhaust lift mechanism is in a reference state controlling the lift of the exhaust valve to a predetermined reference lift, and EGR rate parameter-calculating means for calculating an EGR rate parameter indicative of an EGR rate which is a ratio of an internal EGR amount to a total amount of gases existing in the cylinder, based on the calculated first and second fresh intake air amounts.

In this combustion engine, by changing the lift of the exhaust valve by the variable exhaust lift mechanism, internal EGR in which combustions gases are caused to remain the cylinder is controlled. Further, the fresh air flow rate sensor detects a flow rate of fresh air flowing through the intake pipe, and the first fresh intake air amount-calculating means calculates an amount of fresh intake air drawn into the cylinder, based on the detected flow rate of fresh air, as a first fresh intake air amount. Therefore, irrespective of whether combustion gases are caused to remain in the cylinder by the internal EGR, the first fresh intake air amount represents the amount of fresh air actually drawn into the cylinder.

On the other hand, the second fresh intake air amount-calculating means calculates a second fresh intake air amount based on the volumetric efficiency by a speed-density method according to the detected rotational speed of the engine and the detected intake pipe pressure. In this case, the second fresh intake air amount is calculated as an amount of fresh air estimated to be drawn into the cylinder when the variable exhaust lift mechanism is in a reference state controlling the lift of the exhaust valve to a predetermined reference lift. Therefore, when the reference state of the variable exhaust lift mechanism is set to a state controlling the internal EGR amount to 0, the second fresh intake air amount represents an amount of intake air drawn into the cylinder without causing combustion gases to be present in the cylinder by internal EGR.

From the above-described calculation method, the difference between the second fresh intake air amount and the first fresh intake air amount corresponds to an internal EGR amount caused to remain in the combustion by internal EGR. Further, the actual fresh intake air amount is represented by the first fresh intake air amount. Therefore, by calculating an EGR rate parameter indicative of an EGR rate which is a ratio of the internal EGR amount to the total amount of gases existing in the cylinder(fresh intake air amount+internal EGR amount), based on the calculated first and second fresh intake air amounts, using the EGR rate parameter-calculating means, it is possible to calculate the EGR rate parameter with accuracy. As a result, as distinct from the conventional EGR control systems, it is possible to calculate the EGR rate with accuracy even when the EGR rate is low, without providing a dedicated device for determining the EGR rate, such as an oxygen concentration sensor provided in the intake pipe. Further, according to the EGR rate thus accurately calculated, it is possible to properly perform the EGR control.

Preferably, the EGR control system further comprises demanded torque-determining means for determining torque demanded of the engine, target value-setting means for setting a target value of the EGR rate parameter, based on the rotational speed of the engine and the determined demanded torque, correction coefficient-calculating means for calculating a correction coefficient such that the EGR rate parameter becomes equal to the target value, and EGR control means for controlling the variable exhaust lift mechanism, based on the calculated correction coefficient.

With this configuration of the preferred embodiment, the target value-setting means sets a target value of the EGR rate parameter, based on the rotational speed of the engine and the demanded torque, and the correction coefficient-calculating means calculates a correction coefficient such that the EGR rate parameter becomes equal to the target value, and the EGR control means controls the variable exhaust lift mechanism, based on the calculated correction coefficient. As described hereinabove, the EGR rate parameter represents the actual EGR rate, and is accurately calculated by the method described referring to the EGR control system according to third aspect of the present invention. Therefore, by using the EGR rate parameter thus accurately calculated, and controlling the variable exhaust lift mechanism based on the correction coefficient calculated such that the EGR rate parameter becomes equal to the target value, the actual EGR rate can be accurately controlled to the target value thereof, whereby the EGR control can be properly performed.

More preferably, the engine includes an exhaust recirculation mechanism that controls external EGR in which part of exhaust gases exhausted from the cylinder is recirculated to a portion of the intake pipe downstream of the fresh air flow rate sensor, and the second fresh intake air amount-calculating means calculates an amount of fresh intake air estimated to be drawn into the cylinder when the variable exhaust lift mechanism is in the reference state and at the same time the exhaust recirculation mechanism is in a stopped state in which the external EGR is stopped, as the second fresh intake air amount, based on the rotational speed of the engine and the intake pipe pressure, the EGR rate parameter-calculating means calculating an EGR rate parameter indicative of an EGR rate which is a ratio of a sum of the internal EGR amount and an external EGR amount to the total amount of gases existing in the cylinder, as the EGR rate parameter, based on the first and second fresh intake air amounts.

With the configuration of this preferred embodiment, the engine includes the exhaust recirculation mechanism, which controls external EGR in which part of exhaust gases exhausted from the cylinder is recirculated to the intake pipe. In this case, the exhaust gases are recirculated to a portion of the intake pipe downstream of the fresh air flow rate sensor, and hence the first fresh intake air amount calculated by the first fresh intake air amount-calculating means represents an amount of fresh air actually drawn into the cylinder irrespective of whether or not combustion gases due to internal EGR and exhaust gases due to external EGR are present.

Further, in this preferred embodiment, the second fresh intake air amount-calculating means calculates an amount of fresh intake air drawn into the cylinder when the variable exhaust lift mechanism is in the reference state and at the same time the exhaust recirculation mechanism is in a stopped state in which the external EGR is stopped, as the second fresh intake air amount, based on the rotational speed of the engine and the intake pipe pressure. Therefore, by calculating an EGR rate parameter indicative of an EGR rate which is a ratio of a sum of the internal EGR amount and the external EGR amount to the total amount of gases existing in the cylinder (fresh intake air amount+internal EGR amount+external EGR amount), based on the calculated first and second fresh intake air amounts, using the EGR rate parameter-calculating means, it is possible to calculate the EGR rate parameter with accuracy. As a result, even when the external EGR is executed concurrently to the internal EGR, the EGR rate resulting from the combination of the two EGRs can be accurately calculated, and accordingly the EGR control can be properly performed.

The above and other objects, features, and advantages of the present invention will become more apparent from the following detailed description taken in conjunction with the accompanying drawings.

BRIEF DESCRIPTION OF THE DRAWINGS

FIG. 18 is a view of an example of a map for use in calculation of a target value KEGRCMD;

FIG. 19 is a view of an example of a map for use in calculation of an internal EGR ratio EGRDIVIN;

FIG. 23 is a view of an example of a map for use in calculation of a target turning angle SAAEXCMD for a low-lift mode;

FIG. 24 is a view of an example of a map for use in calculation of a target exhaust cam phase CAEXCMD for the low-lift mode;

FIG. 25 is a view of an example of a map for use in calculation of a target intake cam phase CAINCMD for the low-lift mode;

FIG. 26 is a view of an example of a map for use in calculation of a target EGR lift LCMD;

DETAILED DESCRIPTION OF PREFERRED EMBODIMENTS

Figure 2:
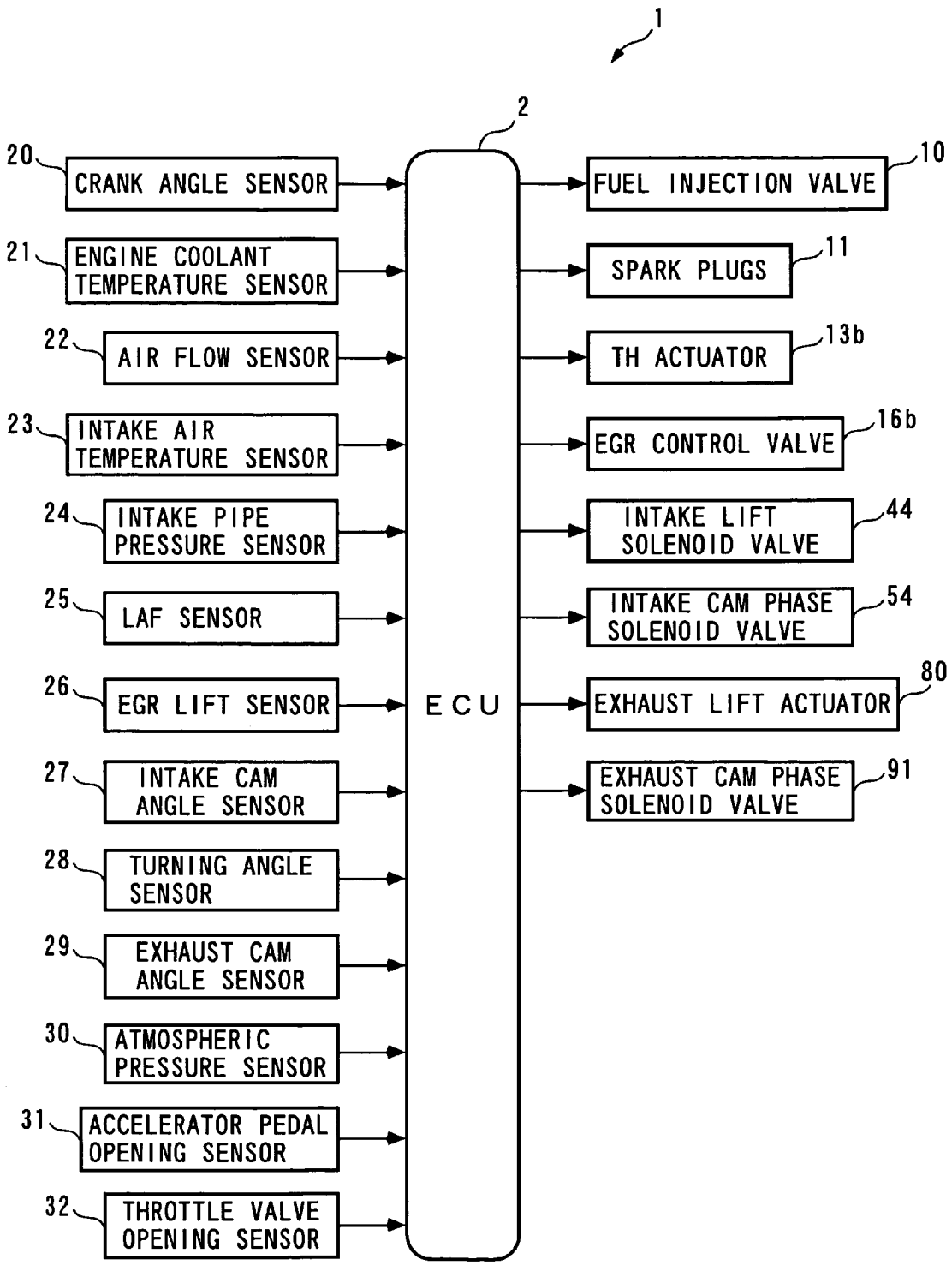
FIG. 2 is a schematic block diagram of the EGR control system.

The present invention will now be described in detail with reference to the drawings showing a preferred embodiment thereof. FIG. 2 is a block diagram showing an EGR control system for an internal combustion engine (hereinafter referred to as "the engine") 3, according to the embodiment of the present invention. As shown in FIG. 2, the EGR control system 1 includes an ECU 2. The ECU 2 carries out control processes, as described hereinafter, including an EGR control process, depending on operating conditions of the engine 3.

Figure 1:
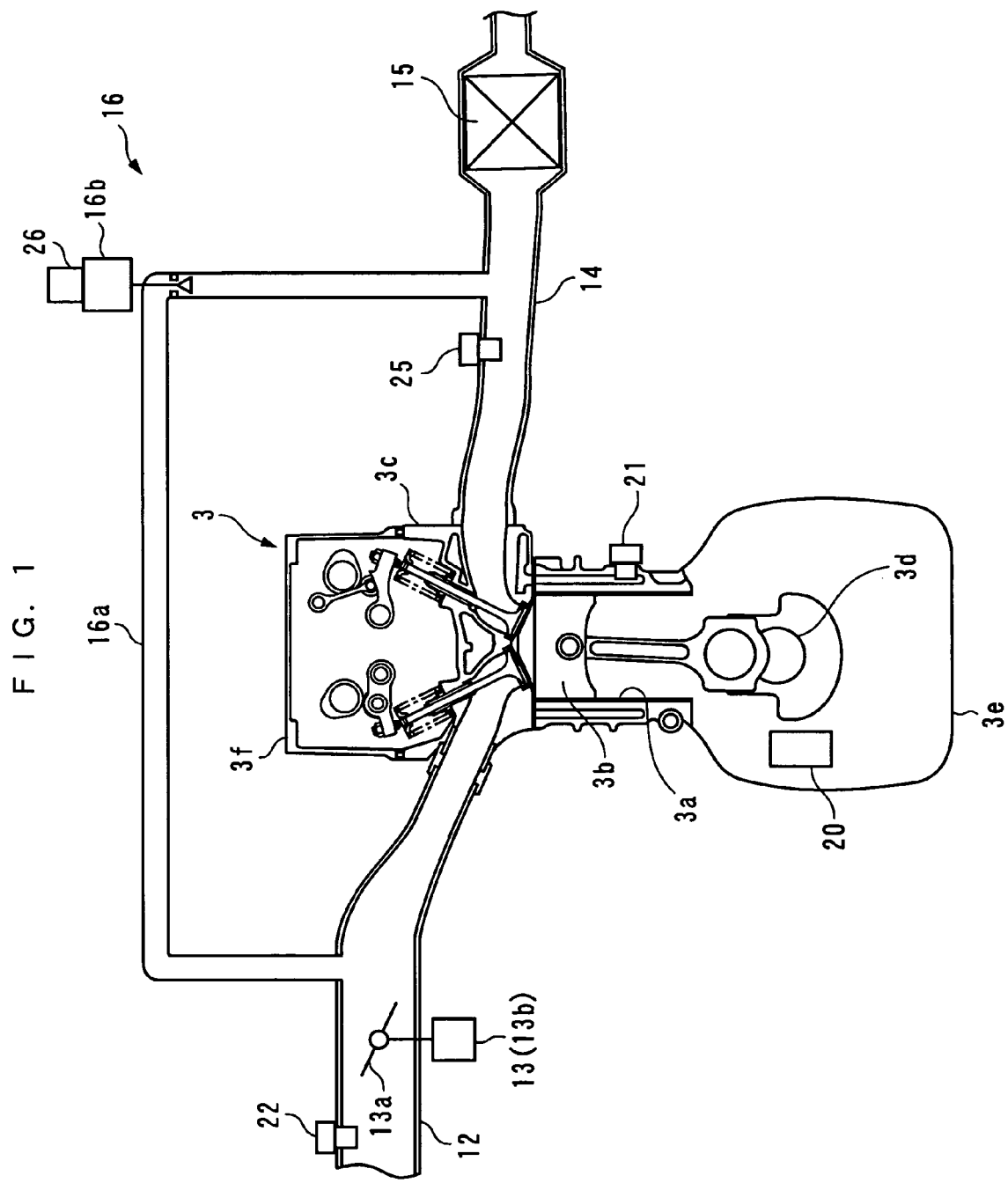
FIG. 1 is a schematic diagram of an internal combustion engine to which is applied an EGR control system according to an embodiment of the present invention.
Figure 3:
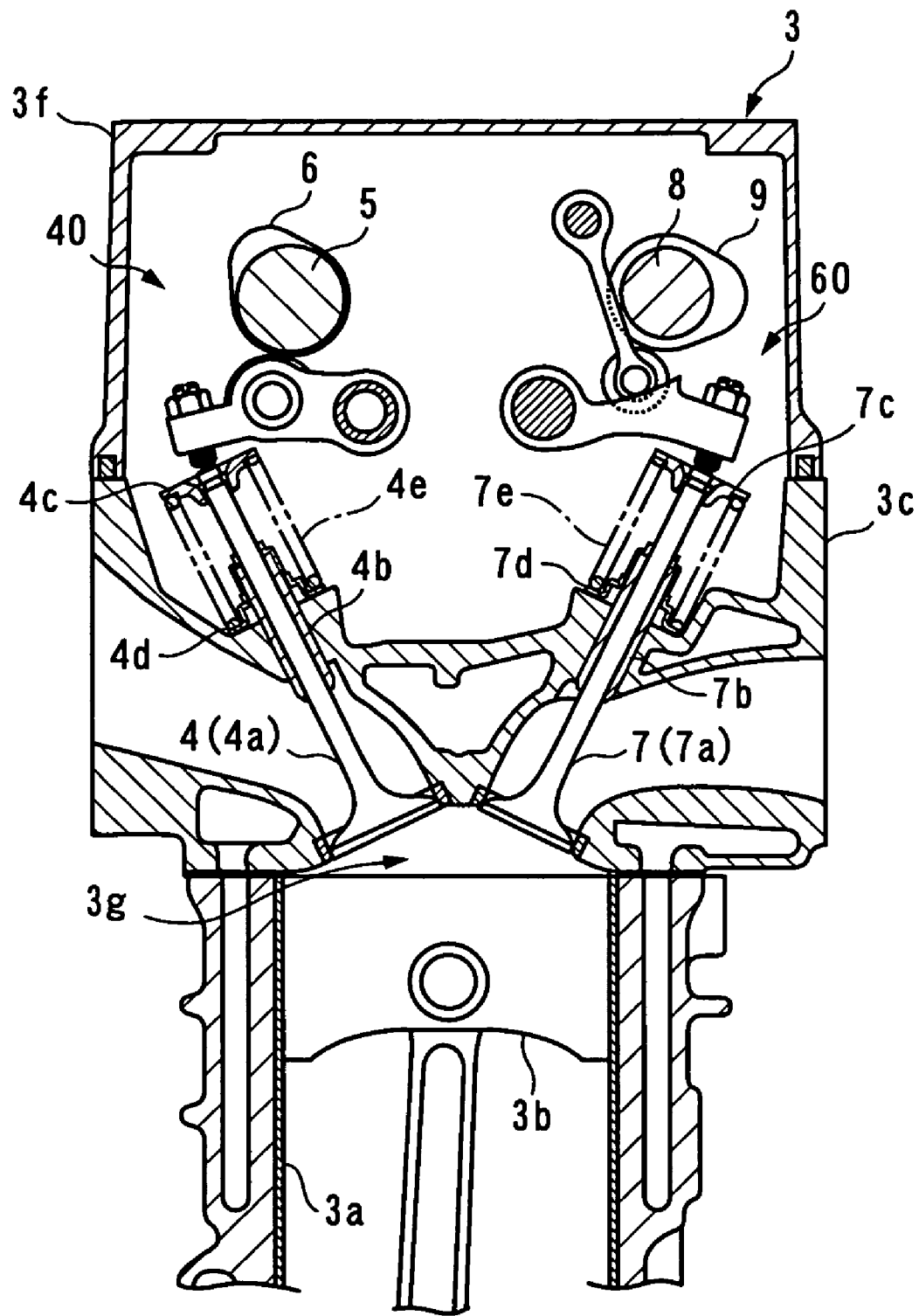
FIG. 3 is a schematic cross-sectional view of an intake-side valve actuating mechanism and an exhaust-side valve actuating mechanism of the engine.

As shown in FIGS. 1 and 3, the engine 3 is an inline four-cylinder gasoline engine installed on an automotive vehicle, not shown, and has four pairs (only one of which is shown) of cylinders 3a and respective pistons 3b associated therewith. Further, the engine 3 has a combustion chamber 3g defined between the piston 3b in each cylinder 3a and a cylinder head 3c.

Figure 9:
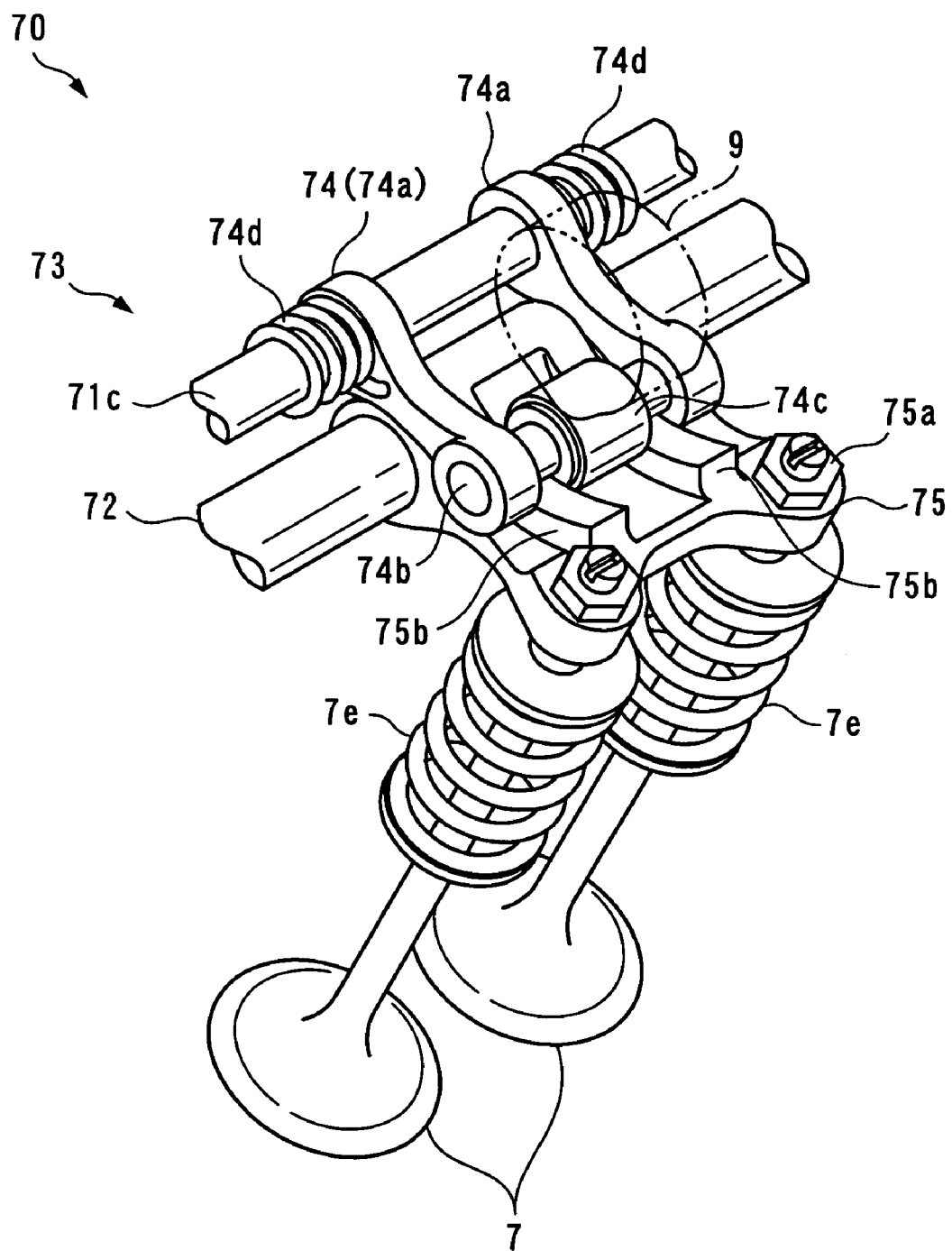
FIG. 9 is a perspective view of a linkage of the variable exhaust lift mechanism.

The engine 3 includes, on a cylinder-by-cylinder basis, a pair of intake valves 4 and 4 (only one of which is shown) and a pair of exhaust valves 7 and 7 (see FIG. 9). Further, the engine 3 includes an intake-side valve actuating mechanism 40 comprised of an intake camshaft 5 and intake cams 6, for opening and closing the intake valves 4, an exhaust-side valve actuating mechanism 60 comprised of an exhaust camshaft 8 and exhaust cams 9, for opening and closing the exhaust valves 7, fuel injection valves 10 (see FIG. 2), and ignition plugs 11 (see FIG. 2).

Each intake valve 4 has a stem 4a thereof slidably fitted in a guide 4b fixed to the cylinder head 3c. The intake valve 4 is urged in the valve-closing direction by upper and lower spring seats 4c and 4d and a valve spring 4e disposed therebetween.

The intake camshaft 5 and the exhaust camshaft 8 are rotatably mounted through the cylinder head 3c via respective holders, not shown, such that they extend in the direction of arrangement of the cylinders 3a. An intake sprocket, not shown, is coaxially mounted on one end of the intake camshaft 5 in a rotatable manner. The intake sprocket is connected to a crankshaft 3d by a timing chain, not shown, and to the intake camshaft 5 via a variable intake cam phase mechanism 50, described hereinafter. With this arrangement, the intake camshaft 5 rotates one turn per two turns of the crankshaft 3d.

The intake cams 6 are provided on the intake camshaft 5 for rotation in unison therewith. Each intake cam 6 is comprised of two low-speed cams and a single high-speed cam having a higher cam nose than that of the low-speed cam, which are provided in association with each cylinder 3a.

The intake-side valve actuating mechanism 40 is configured to open and close the intake valves 4 of each cylinder 3a by rotation of the intake camshaft 5 caused by rotation of the crankshaft 3d, and is implemented by a variable valve actuating mechanism that switches the lift of the intake valves 4 between two stages and continuously changes the valve timing of the intake valves 4. It should be noted that in the present embodiment, the term "the lift of the intake valves 4 (hereinafter referred to as "the intake lift")" represents the maximum lift of the intake valves 4.

Each exhaust valve 7 has a stem 7a thereof slidably fitted in a guide 7b fixed to the cylinder head 3c. The exhaust valve 7 is urged in the valve-closing direction by upper and lower spring seats 7c and 7d and a valve spring 7e disposed therebetween.

An exhaust sprocket, not shown, is coaxially mounted on one end of the exhaust camshaft 8 in a rotatable manner. The exhaust sprocket is connected to the crankshaft 3d by a timing chain, not shown, and to the exhaust camshaft 8 via a variable exhaust cam phase mechanism 90, described hereinafter. With this arrangement, the exhaust camshaft 8 rotates one turn per two turns of the crankshaft 3d. The exhaust cams 9 are provided on the exhaust camshaft 8 in association with the cylinders 3a, respectively, for rotation in unison with the exhaust camshaft 8.

The exhaust-side valve actuating mechanism 60 is configured to open and close the exhaust valves 7 of each cylinder 3a by rotation of the exhaust camshaft 8 caused by rotation of the crankshaft 3d, and is implemented by a variable valve actuating mechanism that continuously changes the lift and valve timing of the exhaust valves 7. In the present embodiment, the term "the lift of the exhaust valves 7 (hereinafter referred to as "the exhaust lift")" represents the maximum lift of the exhaust valves 7.

The fuel injection valves 10 are provided for the respective cylinders 3a, and are each mounted through an associated one of the cylinder heads 3c so as to inject fuel directly into the associated combustion chamber 3g. In short, the engine 3 is configured as a direct injection engine. Further, each of the fuel injection valves 10 is electrically connected to the ECU 2, and has its valve open time period and valve-opening timing controlled by the ECU 2 based on a fuel injection amount TOUT, referred to hereinafter.

The ignition plugs 11 are also provided for the respective cylinders 3a, and are each mounted through an associated one of the cylinder heads 3c. Each of the ignition plugs 11 is electrically connected to the ECU 2, and has its discharge state controlled by the ECU 2, for burning a mixture within an associated one of the combustion chambers 3g in ignition timing.

The engine 3 is provided with a crank angle sensor 20 and an engine coolant temperature sensor 21. The crank angle sensor 20 is formed by a combination of a magnet rotor and an MRE pickup, and delivers a CRK signal and a TDC signal, which are both pulse signals, to the ECU 2 in accordance with rotation of the crankshaft 3d.

Each pulse of the CRK signal is generated whenever the crankshaft rotates through a predetermined angle (e.g. 10°). The ECU 2 determines a rotational speed (hereinafter referred to as "the engine speed") NE of the engine 3, based on the CRK signal. In the present embodiment, the engine speed NE corresponds to first, second, and third operating condition parameters. The TDC signal indicates that the piston 3b has come to a predetermined crank angle position immediately before the TDC position at the start of the intake stroke, on a cylinder-by-cylinder basis, and each pulse of the TDC signal is generated whenever the crankshaft rotates through a predetermined angle.

The engine coolant temperature sensor 21 senses an engine coolant temperature TW which is the temperature of an engine coolant circulating through a cylinder block 3e of the engine 3, and delivers a signal indicative of the sensed engine coolant temperature TW to the ECU 2.

In an intake pipe 12 of the engine 3, there are arranged an air flow sensor 22 and a throttle valve mechanism 13 from upstream to downstream in the mentioned order at respective locations of the intake pipe 12. The air flow sensor 22 is formed by a hot-wire air flow meter, for detecting a flow rate GIN of fresh air (hereinafter referred to as "the fresh air flow rate GIN") flowing through the intake pipe 12, and delivers a signal indicative of the sensed fresh air flow rate GIN to the ECU 2. In the present embodiment, the fresh air flow rate corresponds to the first operating condition parameter.

The throttle valve mechanism 13 includes a throttle valve 13a, and a TH actuator 13b that opens and closes the throttle valve 13a. The throttle valve 13a is pivotally disposed across an intermediate portion of the intake pipe 12 such that the throttle valve 13a is pivotally moved to change the degree of opening thereof, thereby changing the fresh air flow rate GIN within the intake pipe 12. The TH actuator 13b is implemented by a combination of a motor, not shown, connected to the ECU 2, and a gear mechanism, not shown, and is controlled by a TH control input U_TH, referred to hereinafter, from the ECU 2 to thereby change the degree of opening of the throttle valve 13a.

The throttle valve 13a has two springs (neither of which is shown) mounted thereto for urging the throttle valve 13a in the valve-opening direction and the valve-closing direction, respectively. As described in detail hereinafter, when the TH control input U_TH is set to a value of 0, or when the TH control input U_TH is not input to the TH actuator 13b, the throttle valve 13a is held at a predetermined initial valve opening degree by the urging forces of the two springs. The initial valve opening degree is set to a value (e.g. 6°) which corresponds to an almost fully-closed state but at the same time ensures an appropriate amount of intake air for idling or starting of the engine 3 during stoppage of the vehicle and for maintaining a low-speed traveling condition during travel of the same.

Further, an intake air temperature sensor 23 and an intake pipe pressure sensor 24 (see FIG. 2 for both of them) are disposed at respective locations downstream of the throttle valve mechanism 13 in the intake pipe 12. The intake air temperature sensor 23 senses a temperature (intake air temperature TA) of intake air flowing through the intake pipe 12 and delivers a signal indicative of the sensed intake air temperature TA to the ECU 2.

The intake pipe pressure sensor 24 is implemented e.g. by a semiconductor pressure sensor, and detects a pressure PBA in the intake pipe 12 (hereinafter referred to as "the intake pipe pressure PBA"), to deliver a signal indicative of the sensed intake pipe pressure PBA to the ECU 2. This intake pipe pressure PBA is detected as absolute pressure. In the present embodiment, the intake pipe pressure PBA corresponds to the first operating condition parameter.

In an exhaust pipe 14 of the engine 3, there are arranged an LAF sensor 25 and a catalyst 15 from upstream to downstream in the mentioned order at respective locations of the exhaust pipe 14. The LAF sensor 25 is comprised of a zirconia layer and platinum electrodes, and detects the concentration of oxygen contained in exhaust gases linearly in a wide range of the air-fuel ratio ranging from a rich region to a lean region, to deliver to the ECU 2 a signal indicative of the sensed oxygen concentration. The ECU 2 calculates a detected air-fuel ratio KACT indicative of the air-fuel ratio in exhaust gases, based on the value of the signal from the LAF sensor 25. In this case, the detected air-fuel ratio KACT is calculated as an equivalent ratio.

Further, the engine 3 has an exhaust gas recirculation mechanism 16. The exhaust gas recirculation mechanism 16 recirculates exhaust gases from the exhaust pipe 14 into the intake pipe 12, and is comprised of an EGR pipe 16a connecting between the intake pipe 12 and the exhaust pipe 14, and an EGR control valve 16b for opening and closing the EGR pipe 16a. One end of the EGR pipe 16a opens into the exhaust pipe 14 at a location upstream of the catalyst 15, and the other end of the same opens into the intake pipe 12 at a location downstream of the throttle valve mechanism 13.

The EGR control valve 16b is of a linear solenoid valve type which is configured such that the lift thereof (hereinafter referred to as "the EGR lift") changes linearly between the maximum value and the minimum value according to an EGR lift control input U-LIFT, referred to hereinafter, from the ECU 2, thereby changing the degree of opening of the EGR pipe 16a, i.e. an exhaust gas recirculation amount (hereinafter referred to as "the external EGR amount).

The EGR control valve 16b has an EGR lift sensor 26 mounted thereto. The EGR lift sensor 26 detects an actual EGR lift LACT of the EGR control valve 16b and delivers a signal indicative of the sensed EGR lift LACT to the ECU 2. The ECU 2 controls the external EGR amount by the EGR control valve 16b, as described in detail hereinafter, such that the EGR lift LACT converges to a target EGR lift LCMD. It should be noted that in the following description, recirculation of exhaust gases by the exhaust gas recirculation mechanism 16 is referred to as "external EGR".

In the present embodiment, the exhaust gas recirculation mechanism 16 corresponds to a low-temperature gas recirculation device, and exhaust gases recirculated by the exhaust gas recirculation mechanism 16 corresponds to a low-temperature gas.

Figure 4:
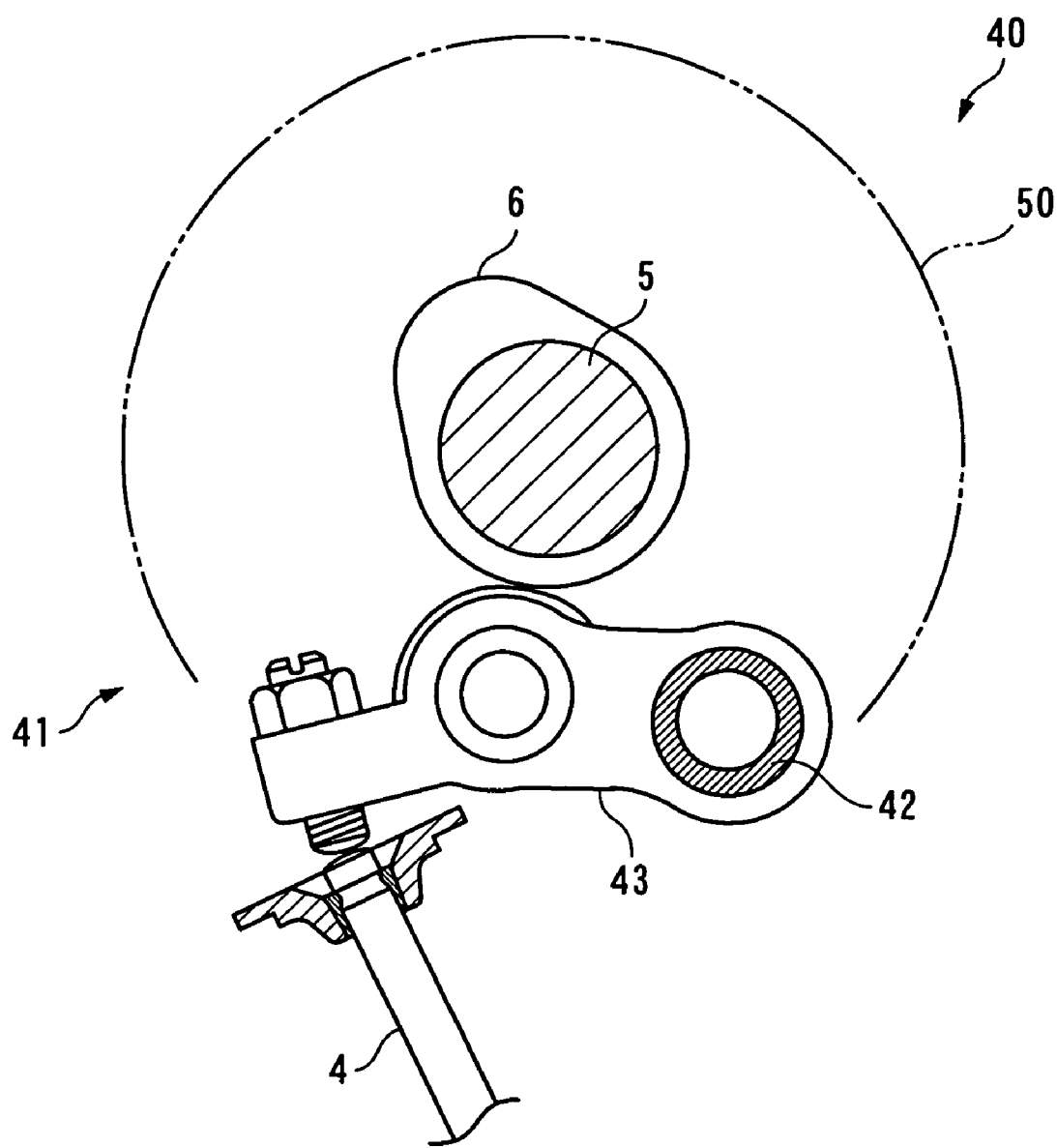
FIG. 4 is a schematic view of the intake-side valve actuating mechanism.

Next, a description will be given of the intake-side valve actuating mechanism 40. As shown in FIG. 4, the intake-side valve actuating mechanism 40 is comprised of the intake camshaft 5, the intake cams 6, an intake lift switching mechanism 41, and the variable intake cam phase mechanism 50.

The intake lift switching mechanism 41 is configured similarly to that proposed by the present assignee e.g. in Japanese Laid-Open Patent Publication (Kokai) No. 2000-227013, which is incorporated herein by reference, and therefore detailed description thereof is omitted. The intake lift switching mechanism 41 is comprised of a rocker-arm shaft 42, a set of low-speed rocker arms 43 and 43 (only one of which is shown) and a high-speed rocker arm, not shown, which set is pivotally fitted on the rocker-arm shaft 42, on a cylinder-by-cylinder basis, and an intake lift solenoid valve 44 (see FIG. 2) connected to the ECU 2. The low-speed rocker arms 43 and 43 are in contact with the respective intake valve 4 and 4 of each cylinder 3a.

In the intake lift switching mechanism 41, the intake lift solenoid valve 44 is controlled by an intake lift control input U_VTEC from the ECU 2, whereby the operation mode of the intake lift switching mechanism 41 is switched to a low-lift mode or a high-lift mode. In the low-lift mode, as the intake camshaft 5 rotates, the low-speed rocker arms 43 are driven by the associated low-speed cams, and the high-speed rocker arm is driven by the associated high-speed cam. In this case, however, the high-speed rocker arm pivotally moves about the rocker-arm shaft 42 separately from the intake valves 4. As a consequence, the intake valves 4 are opened and closed by the low-speed rocker arms 43 to a predetermined lift over a predetermined valve open time period.

On the other hand, in the high-lift mode, the high-speed locker arm is integrally connected to the rocker arms 43 and 43. As the intake camshaft 5 rotates, the high-speed rocker arm is driven by the high-speed cams, whereby as the high-speed rocker arm rotates, the low-speed rocker arms 43 rotate in unison with the high-speed rocker arm. As a consequence, in the high-lift mode, the intake valves 4 are opened and closed by the high-speed rocker arm via the low-speed rocker arms 43, whereby the intake valves 4 are opened to a higher lift over a longer valve open time period than in the low-lift mode. When the engine 3 is to be operated in a compression ignition combustion mode, described hereinafter, the operation mode of the intake lift switching mechanism 41 is set to the low-lift mode.

Figure 5:
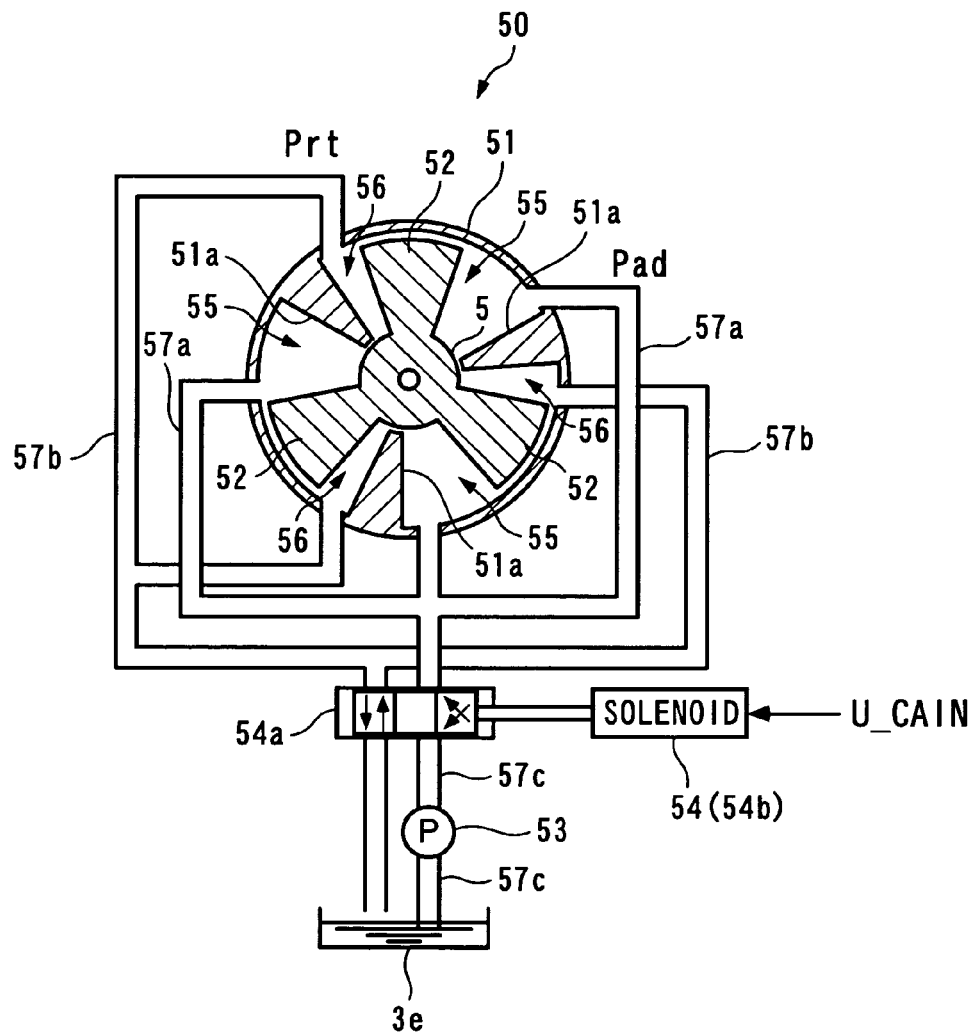
FIG. 5 is a schematic view of a variable intake cam phase mechanism.

Next, a description will be given of the variable intake cam phase mechanism 50. The variable intake cam phase mechanism 50 continuously advances or retards a relative phase CAIN of the intake camshaft 5 with respect to the crankshaft 3d (hereinafter referred to as "the intake cam phase CAIN"), and is provided at the one end of the intake camshaft 5 where the intake sprocket is mounted. As shown in FIG. 5, the variable intake cam phase mechanism 50 includes a housing 51, a three-bladed vane 52, an oil pressure pump 53, and an intake cam phase solenoid valve 54.

The housing 51 is integrally formed with the intake sprocket on the intake camshaft 5, and is divided by three partition walls 51a formed at equal intervals. The vane 52 is coaxially mounted on the end of the intake camshaft 5 where the intake sprocket is mounted, such that the blades of the vane 52 radially extend outward from the intake camshaft 5, and are rotatably housed in the housing 51. Further, the housing 51 has three advance chambers 55 and three retard chambers 56 each formed between one of the partition walls 51a and one of the three blades of the vane 52.

The oil pressure pump 53 is a mechanical one connected to the crankshaft 3d. As the crankshaft 3d rotates, the oil pressure pump 53 draws lubricating oil stored in an oil pan 3e of the engine 3 via a lower part of an oil passage 57c, for pressurization, and supplies the pressurized oil to the intake cam phase solenoid valve 54 via the remaining part of the oil passage 57c.

The intake cam phase solenoid valve 54 is formed by combining a spool valve mechanism 54a and a solenoid 54b, and is connected to the advance chambers 55 and retard chambers 56 via an advance oil passage 57a and a retard oil passage 57b such that oil pressure Poil supplied from the oil pressure pump 53 is delivered to the advance chambers 55 and the retard chambers 56 as advance oil pressure Pad and retard oil pressure Prt. The solenoid 54b of the intake cam phase solenoid valve 54 is electrically connected to the ECU 2, and is responsive to an intake phase control input U_CAIN, referred to hereinafter, from the ECU 2, for moving a spool valve element of the spool valve mechanism 54a within a predetermined range of motion to thereby change both the advance oil pressure Pad and the retard oil pressure Prt.

Figure 6:
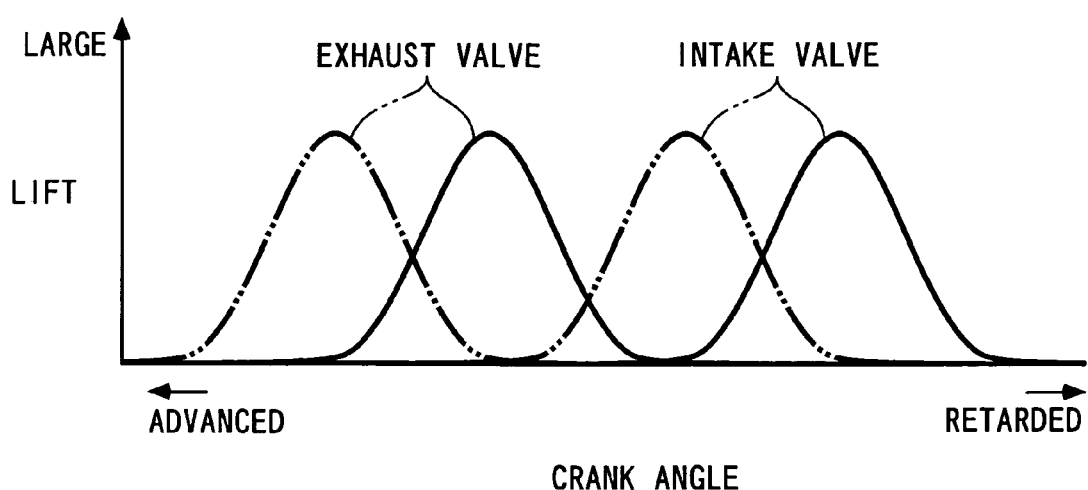
FIG. 6 is a diagram of valve lift curves of an intake valve depicted in respective cases where the variable intake cam phase mechanism sets an intake cam phase to a most retarded value (solid line) and a most advanced value (two dot-chain line), and valve lift curves of an exhaust valve depicted in respective cases where a variable exhaust cam phase mechanism sets an exhaust cam phase to a most retarded value (solid line) and a most advanced value (two dot-chain line)

In the variable intake cam phase mechanism 50 configured as above, during operation of the oil pressure pump 53, the intake cam phase solenoid valve 54 is operated according to the intake phase control input U_CAIN, to supply the advance oil pressure Pad to the advance chambers 55 and the retard oil pressure Prt to the retard chambers 56, whereby the relative phase of the vane 52 with respect to the housing 51 is changed toward an advanced side or a retarded side. As a result, the aforementioned intake cam phase CAIN is continuously changed between a predetermined most retarded value and a predetermined most advanced value, whereby the valve timing of the intake valves 4 is continuously changed between most retarded timing indicated by a solid line in FIG. 6 and most advanced timing indicated by a two-dot chain line in FIG. 6.

It should be noted that the variable intake cam phase mechanism 50 includes a lock mechanism, not shown, which holds the intake cam phase CAIN at a value corresponding to the intake phase control input U_CAIN. Further, when oil pressure supplied from the oil pressure pump 53 is low, when the intake phase control input U_CAIN is set to a value of 0 as described hereinafter, or when the intake phase control input U_CAIN is not input to the intake cam phase solenoid valve 54 due to a disconnection or the like, the lock mechanism inhibits the variable intake cam phase mechanism 50 from changing the intake cam phase CAIN, whereby the intake cam phase CAIN is locked to a predetermined value for a failure time.

An intake cam angle sensor 27 (see FIG. 2) is disposed at the other end of the intake camshaft 5, opposite to the end where the variable intake cam phase mechanism 50 is disposed. The intake cam angle sensor 27 is implemented e.g. by a magnet rotor and an MRE pickup (neither of which is shown), and delivers an INCAM signal, which is a pulse signal, to the ECU 2 along with rotation of the intake camshaft 5. Each pulse of the INCAM signal is generated whenever the intake camshaft 5 rotates through a predetermined cam angle (e.g. 1°), and the ECU 2 calculates the intake cam phase CAIN based on the INCAM signal and the aforementioned CRK signal.

Figure 7:
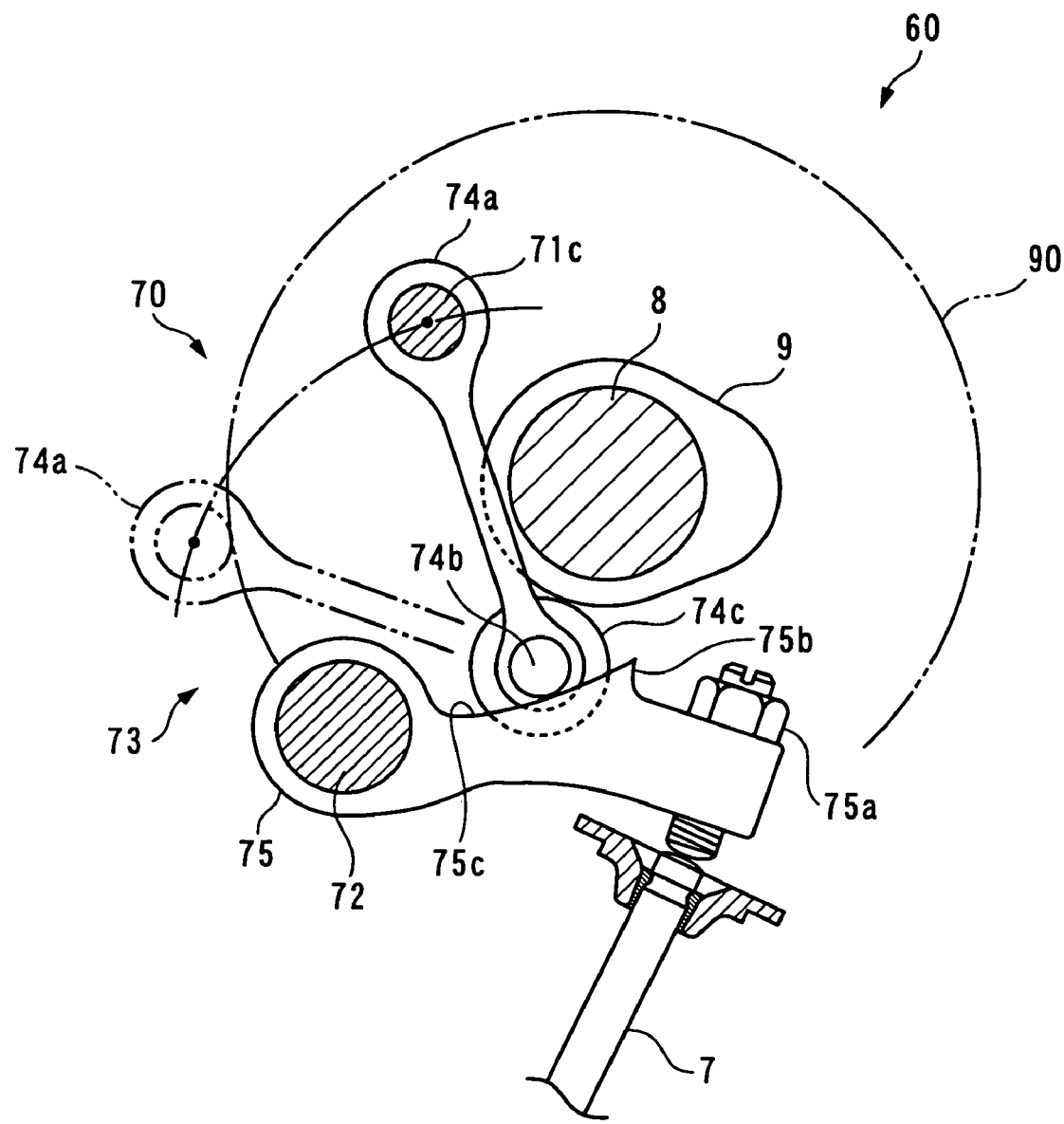
FIG. 7 is a schematic view of the exhaust-side valve actuating mechanism.

Next, a description will be given of the exhaust-side valve actuating mechanism 60. As shown in FIG. 7, the exhaust-side valve actuating mechanism 60 includes the exhaust camshaft 8, the exhaust cam 9, a variable exhaust lift mechanism 70, and the variable exhaust cam phase mechanism 90.

Figure 8:
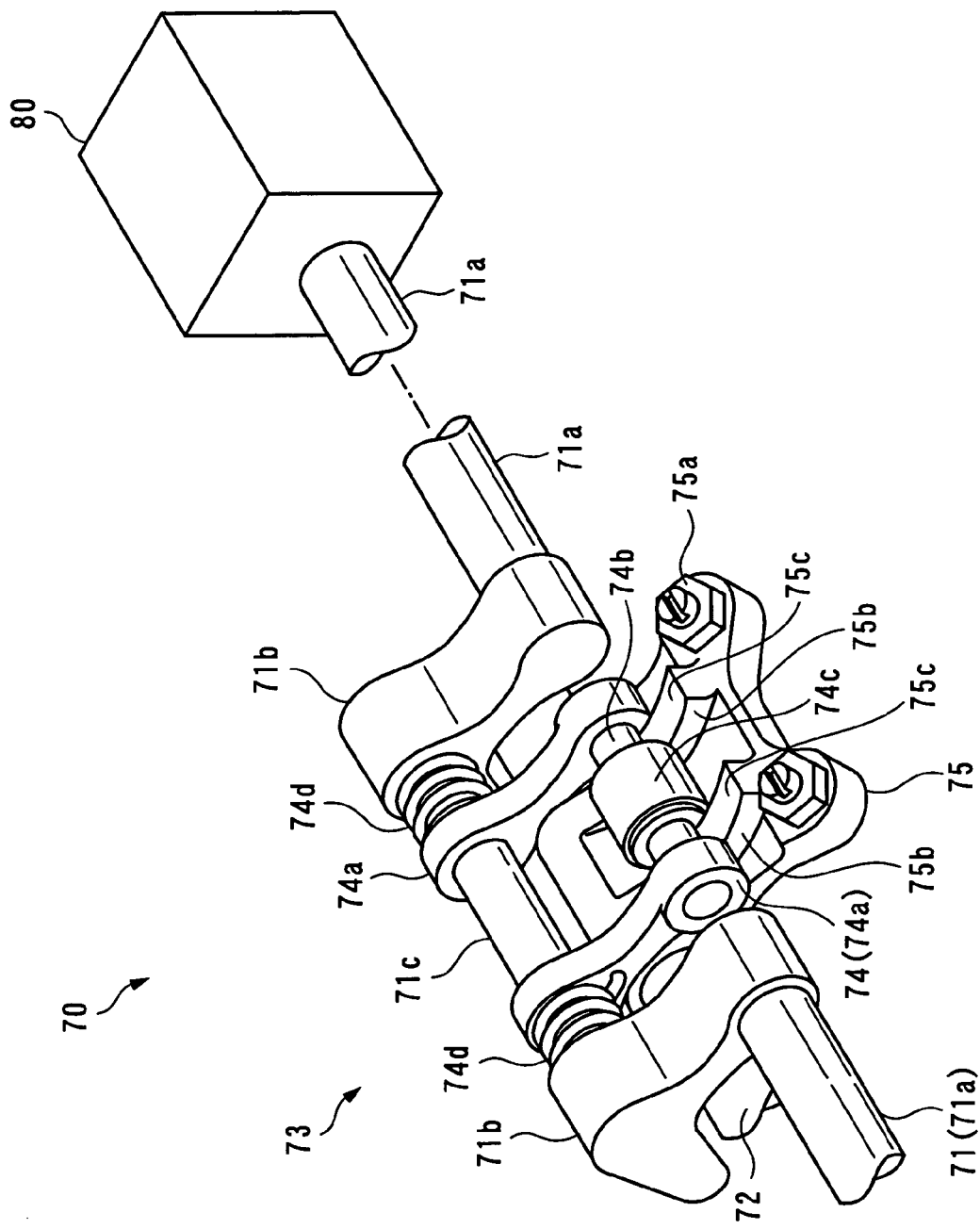
FIG. 8 is a fragmentary perspective view of a variable exhaust lift mechanism.
Figure 10:
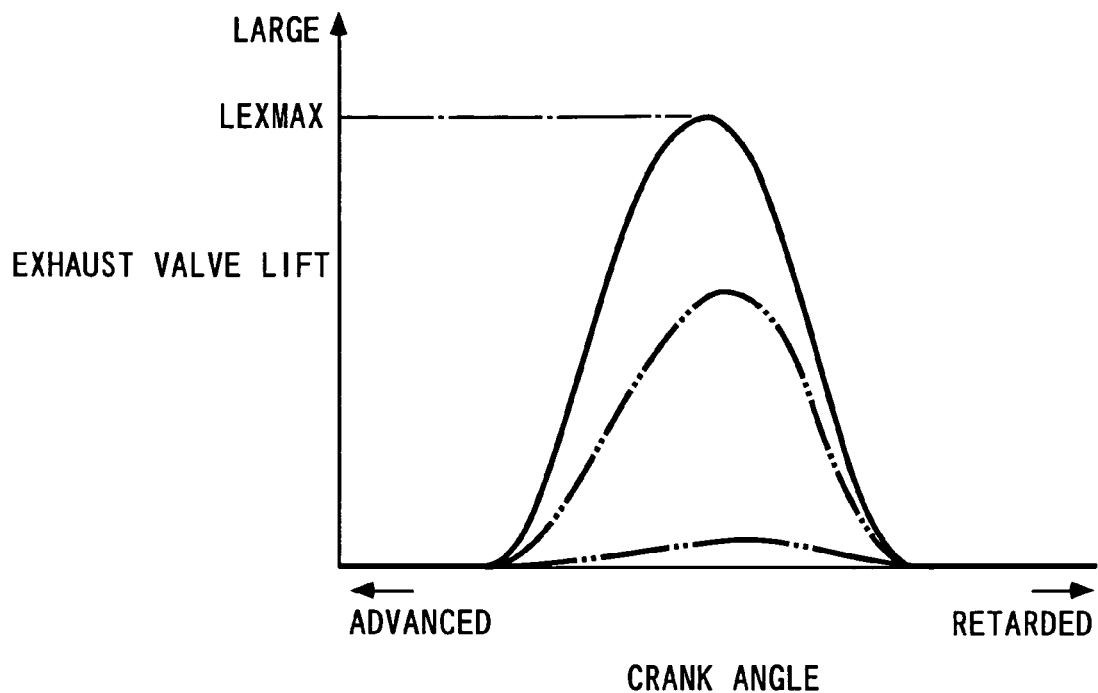
FIG. 10 is a view illustrating changes in exhaust lift by the variable exhaust lift mechanism.

The variable exhaust lift mechanism 70 opens and closes the exhaust valves 7 by rotation of the exhaust camshaft 8 caused by rotation of the crankshaft 3d to thereby continuously change exhaust lift between a value of 0 and a predetermined maximum value LEXMAX (see FIG. 10). As shown in FIGS. 8 and 9, the variable exhaust lift mechanism 70 is comprised of a control shaft 71 and a rocker arm shaft 72, rocker arm mechanisms 73 provided on the shafts 71 and 72 on a cylinder-by-cylinder basis, and an exhaust lift actuator 80 for driving the rocker arm mechanisms 73 simultaneously.

The control shaft 71 is comprised of pivot parts 71a, holder parts 71b, and eccentric shaft parts 71c, which are assembled into a unit. The control shaft 71 extends along the exhaust camshaft 8, with the pivot parts 71a rotatably attached to the cylinder heads 3c, and one pivot part 71a at one end of the unit connected to the exhaust lift actuator 80.

Each of the rocker arm mechanisms 73 is implemented by a combination of upper and lower rocker arms 74 and 75. The upper rocker arm 74 is comprised of a pair of links 74a and 74a, a roller shaft 74b, a roller 74c, and a pair of coil springs 74d and 74d. The roller shaft 74b has opposite ends thereof fitted in one ends of the respective links 74a and 74a, respectively, and is rotatably supported by the links 74a and 74a. The roller 74c is rotatably fitted on the roller shaft 74b.

The other ends of the respective links 74a are pivotally fitted on the eccentric shaft part 71c of the control shaft 71, and are each connected to an associated one of the holder parts 71b via an associated one of the coil springs 74d. The roller 74c is brought into contact with the cam surface of the exhaust cam 9 by the urging forces of the respective coil springs 74d acting on the links 74a, respectively. Further, when the roller 74c is in contact with the circular base part of the cam surface of the exhaust cam 9, the roller shaft 74b is held in its original position (i.e. the position shown in FIG. 7) where the axis of the roller shaft 74b is aligned with the axis of the pivot part 71a.

The lower rocker arm 75 is configured such that one end thereof is pivotally supported by the rocker arm shaft 72, and the other end thereof has adjusting bolts 75a and 75a inserted therethrough, and are in contact with the respective upper ends of the exhaust valves 7 via the adjusting bolts 75a and 75a. When the lower rocker arm 75 is in the valve-closing position shown in FIG. 7, the adjusting bolts 75a and 75a hold the exhaust valves 7 in a closed state, and as the lower rocker arm 75 pivotally moves about the rocker arm shaft 72 downward from the valve-closing position, the adjusting bolts 75a and 75a drive the stem 7a downward against the urging forces of the respective valve springs 7e, whereby the exhaust valves 7 are opened.

Further, the lower rocker arm 75 has a pair of guide parts 75b and 75b projecting upward. Each of the guide parts 75b has an upper surface thereof formed as a guide surface 75c for guiding the roller shaft 74b of the upper rocker arm 74, and is held in contact with the roller shaft 74b via the guide surface 75c by the urging force of the associated one of the valve springs 7e. The guide surface 75c has an arcuate shape which protrudes downward and coincides with an arc drawn about the axis of, i.e. is concentric with, the eccentric shaft part 71c when the links 74a are in the valve-closing position indicated by solid lines in FIG. 7. In the state where the guide parts 75b are in contact with the roller shaft 74b, the roller 74c is positioned between the guide parts 75b and 75b, and is held in contact only with the exhaust cam 9 without being brought into contact with the lower rocker arm 75.

The exhaust lift actuator 80 is implemented by a combination of a motor, not shown, and a reduction gear mechanism, not shown, and is electrically connected to the ECU 2. When driven by the ECU 2, the exhaust lift actuator 80 causes the control shaft 71 to pivotally move about the axis of the pivot parts 71a. As the control shaft 71 pivotally moves, the links 74a pivotally move about the roller shaft 74b.

Next, a description will be given of the operation of the variable exhaust lift mechanism 70 configured as above. In the variable exhaust lift mechanism 70, when the exhaust lift actuator 80 is driven by an exhaust lift control input U_SAAEX, described hereinafter, from the ECU 2, the control shaft 71 starts pivotal motion. When the control shaft 71 is thus pivotally moved, a turning angle SAAEX of the control shaft 71 is limited within a predetermined range by a stopper, not shown, whereby e.g. when the roller shaft 74b is in the aforementioned original position, the turning range of the links 74a is also limited between the zero lift position indicated by the solid line in FIG. 7 and a maximum lift position indicated by a two-dot chain line in FIG. 7.

When the links 74a are in the zero lift position, if the exhaust cam 9 rotates to push the roller 74c by the cam nose thereof toward the rocker arm shaft 72, the links 74a pivotally move clockwise, as viewed in FIG. 7, about the eccentric shaft part 71c. In this case, since the guide surfaces 75c of the lower rocker arm 75 each have the shape which coincides with the arc drawn about the axis of the eccentric shaft part 71c, as described hereinabove, the lower rocker arm 75 is held in the valve-closing position shown in FIG. 7 by the urging forces of the respective valve springs 7e. This holds the exhaust lift at a value of 0, whereby the exhaust valves 7 are held in the closed state.

On the other hand, when the links 74a have been pivotally moved from the zero lift position to a position toward the maximum lift position and held thereat, if the rotation of the exhaust cam 9 causes the links 74a to pivotally move clockwise, as viewed in FIG. 7, about the eccentric shaft part 71c, the lower rocker arm 75 pivotally moves downward from the valve-closing position in FIG. 7 against the urging forces of the respective valve springs 7e to open the exhaust valves 7. In this case, the amount of pivotal motion of the lower rocker arm 75, i.e. the exhaust lift, becomes larger as the links 74a are in a position closer to the maximum lift position.

For the above reason, the exhaust valves 7 open with a larger lift as the links 74a are in a position closer to the maximum lift position. More specifically, during rotation of the exhaust cam 9, when the links 74a are in the maximum lift position, the exhaust valves 7 open in accordance with a valve lift curve indicated by a solid line in FIG. 10, and the exhaust lift shows its maximum value LEXMAX. Therefore, the variable exhaust lift mechanism 70 is capable of pivotally moving the links 74a between the zero lift position and the maximum lift position by the exhaust lift actuator 80 to thereby continuously change the exhaust lift between a value of 0 and the predetermined maximum value LEXMAX.

It should be noted that the variable exhaust lift mechanism 70 includes a lock mechanism, not shown, which locks the turning angle of the control shaft 71, i.e. the exhaust lift, to a predetermined value for a failure time when the exhaust lift control input U_SAAEX is set to a value of 0 as described hereinafter or when the exhaust lift control input U_SAAEX is not input to the exhaust lift actuator 80 due to a disconnection or the like.

Further, the variable exhaust lift mechanism 70 is provided with a turning angle sensor 28 (see FIG. 2) which detects the turning angle SAAEX of the control shaft 71 and delivers a signal indicative of the sensed turning angle SAAEX to the ECU 2.

Next, a description will be given of the variable exhaust cam phase mechanism 90. The variable exhaust cam phase mechanism 90 continuously advances or retards a relative phase CAEX of the exhaust camshaft 8 with respect to the crankshaft 3d (hereinafter referred to as "the exhaust cam phase CAEX"). The variable exhaust cam phase mechanism 90 is provided at the one end of the exhaust camshaft 8 where the exhaust sprocket is mounted.

The variable exhaust cam phase mechanism 90 is configured similarly to the variable intake cam phase mechanism 50, described above, and hence detailed description thereof is omitted. The variable exhaust cam phase mechanism 90 includes an exhaust cam phase solenoid valve 91, and when the exhaust cam phase solenoid valve 91 is driven by an exhaust phase control input U_CAEX, described hereinafter, from the ECU 2, the variable exhaust cam phase mechanism 90 continuously changes the exhaust cam phase CAEX between a predetermined most retarded value and a predetermined most advanced value, whereby the valve timing of the exhaust valves 7 is continuously changed between the most retarded timing indicated by the solid line in FIG. 6 and the most advanced timing indicated by the two-dot chain line in FIG. 6.

It should be noted that the variable exhaust cam phase mechanism 90 includes a lock mechanism, not shown, which holds the exhaust cam phase CAEX at a value corresponding to the exhaust phase control input U_CAEX. Further, when the exhaust phase control input U_CAEX is set to a value of 0 as described hereinafter or when the exhaust phase control input U_CAEX is not input to the exhaust cam phase solenoid valve 91 due to a disconnection or the like, the lock mechanism inhibits the variable exhaust cam phase mechanism 90 from changing the exhaust cam phase CAEX, whereby the exhaust cam phase CAEX is locked to a predetermined value for a failure time.

An exhaust cam angle sensor 29 (see FIG. 2) is disposed at the other end of the exhaust camshaft 8, opposite to the end where the exhaust sprocket is mounted. The exhaust cam angle sensor 29 is implemented e.g. by a magnet rotor and an MRE pickup (neither of which is shown), and delivers an EXCAM signal, which is a pulse signal, to the ECU 2 along with rotation of the exhaust camshaft 8. Each pulse of the EXCAM signal is generated whenever the exhaust camshaft 8 rotates through a predetermined cam angle (e.g. 1°), and the ECU 2 calculates the exhaust cam phase CAEX based on the EXCAM signal and the aforementioned CRK signal.

As described above, in the engine 3, it is possible to continuously change the valve timing of the intake valves 4 by the intake-side valve actuating mechanism 40, as well as to continuously change the lift and valve timing of the exhaust valves 7 by the exhaust-side valve actuating mechanism 60, whereby the amount of combustion gases remaining in the associated cylinder 3a (hereinafter referred to as "the internal EGR amount") can be changed, as desired, by the two valve actuating mechanisms 40 and 60. The temperature of the combustion gases is higher than that of exhaust gases recirculated by the exhaust gas recirculation mechanism 16. In the following description, causing combustion gases to remain in a cylinder 3a by the two valve actuating mechanisms 40 and 60 is referred to as "internal EGR".

In the present embodiment, the variable intake cam phase mechanism 50, the variable exhaust lift mechanism 70, and the variable exhaust cam phase mechanism 90 correspond to a high-temperature recirculation device, and combustion gases remaining in the cylinder 3a correspond to a high-temperature gas.

Further, in the present embodiment, an atmospheric pressure sensor 30, an accelerator pedal opening sensor 31, and a throttle valve opening sensor 32 are connected to the ECU 2. The atmospheric pressure sensor 30 is implemented by a semiconductor pressure sensor, and detects atmospheric pressure PA to deliver a signal indicative of the sensed atmospheric pressure PA to the ECU 2.

The accelerator pedal opening sensor 31 detects accelerator pedal opening AP as the amount of depression of an accelerator pedal, not shown, and delivers a signal indicative of the sensed accelerator pedal opening AP to the ECU 2. In the present embodiment, the accelerator pedal opening AP corresponds to the first, second, and third operating condition parameters. Further, the throttle valve opening sensor 32 is implemented e.g. by a potentiometer. The throttle valve opening sensor 32 detects the degree of opening (hereinafter referred to as "the throttle valve opening") TH of the throttle valve 13b, and delivers a signal indicative of the sensed throttle valve opening TH to the ECU 2.

The ECU 2 is implemented by a microcomputer comprised of a CPU, a RAM, a ROM, and an I/O interface (none of which are shown). The ECU 2 determines operating conditions of the engine 3, based on the outputs from the aforementioned sensors 20 to 32, according to control programs and the like stored in the ROM, and as mentioned hereinabove and as described in detail hereinafter, executes the control processes.

More specifically, as described hereinafter, the ECU 2 executes a fuel injection control process, an EGR control process, an ignition timing control process, and a variable mechanism control process based on the operating conditions of the engine 3, whereby in a predetermined compression ignition combustion region, the engine 3 is operated in a compression ignition combustion mode in which air-fuel mixture is burned by compression spontaneous ignition without effecting spark ignition, and in a spark ignition combustion region other than the predetermined compression ignition combustion region, the engine 3 is operated in a spark ignition combustion mode in which air-fuel mixture is burned by spark ignition.

In the present embodiment, the ECU 2 corresponds to EGR rate parameter-calculating means, target value-setting means, feedback correction value-calculating means, gas amount ratio-setting means, control means, learned value-calculating means, operating condition-detecting means, internal EGR target value-setting means, target operation amount-setting means, EGR control means, target exhaust cam phase-setting means, target intake cam phase-setting means, first fresh intake air amount-calculating means, rotational speed-detecting means, second fresh intake air amount-calculating means, demanded torque-determining means, and correction coefficient-calculating means.

Figure 11:
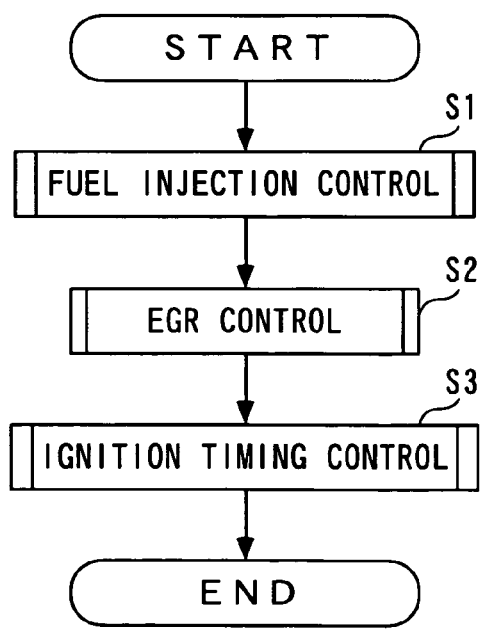
FIG. 11 is a flowchart showing a main flow of a control process executed by an ECU with a control period synchronous with generation of each TDC signal pulse.

Hereafter, a control process executed by the ECU 2 in control timing synchronous with generation of each TDC signal pulse will be described with reference to FIG. 11. In this process, first, in a step 1 (shown as S1 in abbreviated form in FIG. 11; the following steps are also shown in abbreviated form), the fuel injection control process is carried out. The fuel injection control process is executed to calculate the amount TOUT of fuel to be injected into a cylinder 3a (hereinafter referred to as "the fuel injection amount TOUT") from the associated fuel injection valve 10. Details of the process will be described hereinafter. In the following description, calculated values are assumed to be stored in the RAM of the ECU 2.

Then, in a step 2, the EGR control process is carried out. The EGR control process is executed to calculate the target EGR lift LCMD for controlling the external EGR amount via the exhaust gas recirculation mechanism 16 as well as a target turning angle SAAEXCMD, a target exhaust cam phase CAEXCMD, and a target intake cam phase CAINCMD, for controlling the internal EGR amount via the exhaust-side valve actuating mechanism 60 and the intake-side valve actuating mechanism 40, details of which will be described hereinafter.

Next, the ignition timing control process is carried out in a step 3, followed by terminating the present program. In the ignition timing control process, although detailed description thereof is omitted, in the spark ignition combustion mode, ignition timing is calculated based on engine load, etc., whereas in the compression ignition combustion mode, calculation of ignition timing is interrupted. As a result, in the spark ignition combustion mode, ignition by the ignition plug 11 is carried out, whereas in the compression ignition combustion mode, ignition by the ignition plug 11 is stopped.

Figures 12, 13:
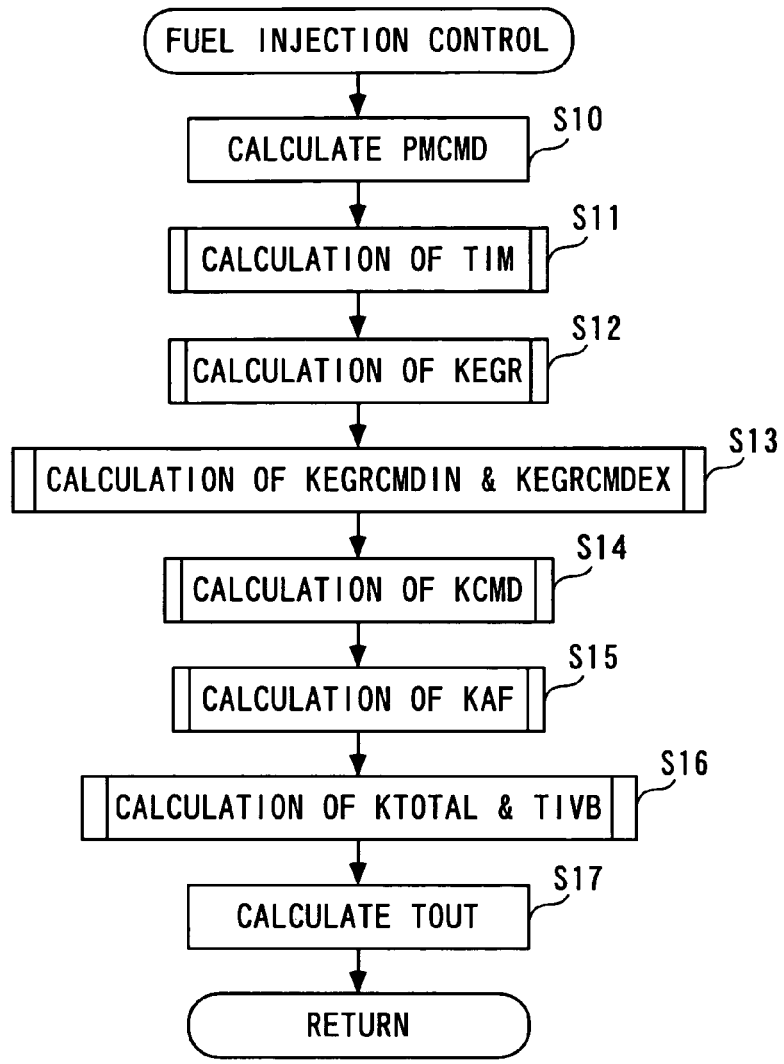
FIG. 12 is a flowchart of a fuel injection control process.
FIG. 13 is a view of an example of a map for use in calculation of a demanded torque PMCMD.

Hereafter, the fuel injection control process will be described with reference to FIG. 12. In this process, first, in a step 10, a demanded torque PMCMD is calculated by searching a map shown in FIG. 13 according to the engine speed NE and the accelerator pedal opening AP. Symbols i and j in FIG. 13 represent positive integers, respectively, and this also applies to the following description. In this map, the demanded torque PMCMD is set to a larger value as the engine speed NE is higher or as the accelerator pedal opening AP is larger. This is because as the engine speed NE is higher or the accelerator pedal opening AP is larger, the engine load is larger, and therefore a larger torque is demanded.

Figure 14:
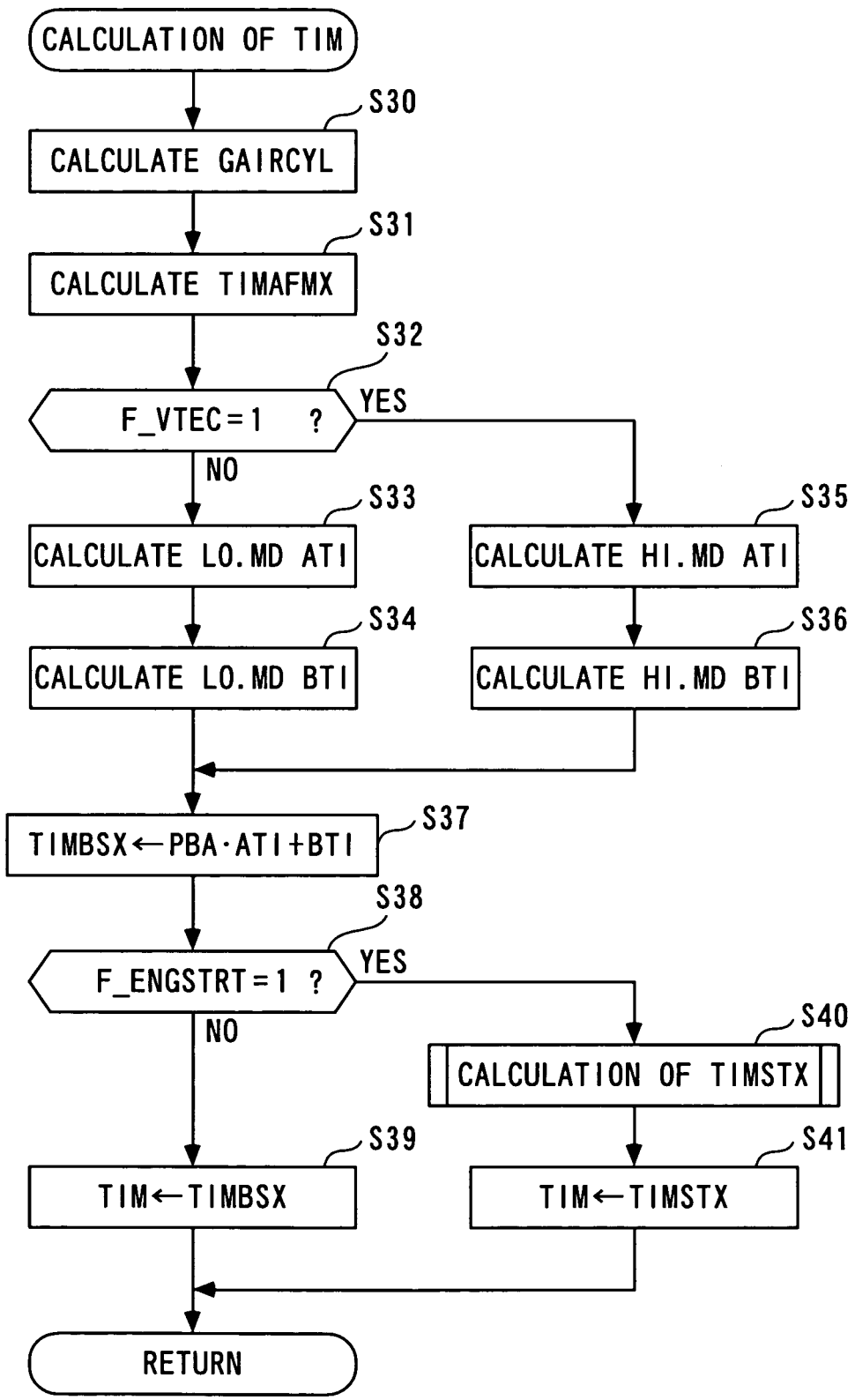
FIG. 14 is a flowchart of a process for calculating a basic fuel injection amount TIM.

Then, the process proceeds to a step 11, wherein a basic fuel injection amount TIM is calculated. More specifically, the basic fuel injection amount TIM is calculated as shown in FIG. 14.

First, in a step 30, a fresh intake air amount GAIRCYL (first fresh intake air amount) is calculated. The fresh intake air amount GAIRCYL is the amount of fresh air estimated to have been drawn into the cylinder 3a, which is calculated based on the fresh air flow rate GIN detected by the air flow sensor 22, the engine speed NE, and so forth.

Figure 15:
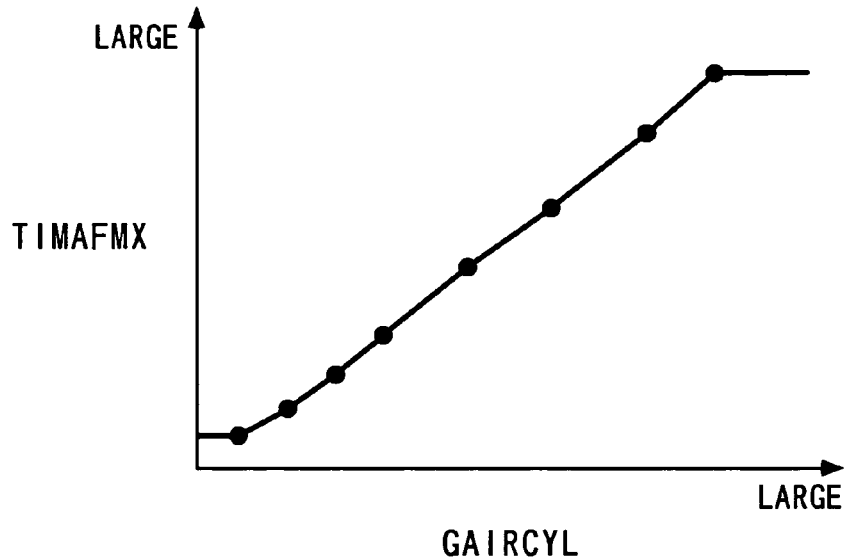
FIG. 15 is a view of an example of a map for use in calculation of a first basic fuel injection amount TIMAFMX.

Then, the process proceeds to a step 31, wherein a first basic fuel injection amount TIMAFMX is calculated by searching a map shown in FIG. 15 according to the fresh intake air amount GAIRCYL calculated in the step 30. In this map, the first basic fuel injection amount TIMAFMX is set to a larger value as the fresh intake air amount GAIRCYL is larger. This is because as the fresh intake air amount GAIRCYL is larger, a required engine output is larger. As is apparent from the above-described calculation method, the first basic fuel injection amount TIMAFMX corresponds to the fresh intake air amount GAIRCYL, i.e. an amount of fresh air actually drawn into the cylinder 3a, and in this sense, corresponds to the first fresh intake air amount in the present invention.

Then, the process proceeds to a step 32, wherein it is determined whether or not an intake lift flag F_VTEC is equal to 1. The intake lift flag F_VTEC is set to 1 when the engine 3 is in an operating region where the operation mode of the intake lift switching mechanism 41 should be set to the aforementioned high-lift mode, whereas when the engine 3 is in an operating region where the operation mode of the intake lift switching mechanism 41 should be set to the low-lift mode, the intake lift flag F_VTEC is set to 0. In the figures, the low-lift mode is represented by "LO. MD", and the high-lift mode by "HI. MD".

If the answer to the question of the step 32 is negative (NO), i.e. if the engine 3 is in the operating region where the operation mode of the intake lift switching mechanism 41 should be set to the low-lift mode, in other words, if the operation mode of the intake lift-switching mechanism 41 has been to the low lift mode, the calculation process proceeds to a step 33, wherein a low-lift mode fuel correction coefficient ATI is calculated by searching a map, not shown, according to the engine speed NE and the intake cam phase CAIN.

Then, in a step 34, a low-lift mode fuel correction term BTI is calculated by searching a map, not shown, according to the engine speed NE and the intake cam phase CAIN.

On the other hand, if the answer to the question of the step 32 is affirmative "YES", i.e. if the engine 3 is in the operating region where the operation mode of the intake lift switching mechanism 41 should be set to the high-lift mode, the calculation process proceeds to a step 35, wherein a high-lift mode fuel correction coefficient ATI is calculated by searching a map, not shown, according to the engine speed NE and the intake cam phase CAIN.

Then, in a step 36, a high-lift mode fuel correction term BTI is calculated by searching a map, not shown, according to the engine speed NE and the intake cam phase CAIN.

In a step 37 following the step 34 or 36, the sum (PBA·ATI+BTI) of the product of the intake pipe pressure and the fuel correction coefficient and the fuel correction term is set to a second basic fuel injection amount TIMBSX.

As is apparent from the calculation method described above, the second basic fuel injection amount TIMBSX corresponds to an fresh intake air amount based on the volumetric efficiency, which is determined by a speed-density method using the engine speed NE and the intake pipe pressure PBA. Further, in the above-mentioned map, the fuel correction coefficient ATI and the fuel correction term BTI are both set assuming that the EGR control system in a reference state in which the exhaust lift mechanism 70 controls the exhaust lift to the maximum value LEXMAX, the variable exhaust cam phase mechanism 90 controls the exhaust cam phase CAEX to the most retarded value; and the exhaust recirculation mechanism 16 has stopped the external EGR. Therefore, the second basic fuel injection amount TIMBSX corresponds to an amount of fresh intake air which is drawn into the cylinder 3a when the internal EGR amount and the external EGR amount are both equal to 0, and in this sense corresponds to the second fresh intake amount in the present invention.

Then, the calculation process proceeds to a step 38, wherein it is determined whether or not an engine start flag F_ENGSTART is equal to 1. When engine start control is being executed, i.e. when the engine 3 is being cranked, the engine start flag F_ENGSTART is set to 1, and otherwise set to 0. If the answer to the question is negative (NO), i.e. if the engine has already been started, the calculation process proceeds to a step 39, wherein the basic fuel injection amount TIM is set to the second basic fuel injection amount TIMBSX, followed by terminating the present calculation process.

On the other hand, if the answer to the question of the step 38 is affirmative (YES), i.e. if the engine 3 is being cranked, the calculation process proceeds to a step 40, wherein a start-time basic fuel injection amount TIMSTX is calculated by searching a map, not shown, according to the engine coolant temperature TW. Then, in a step 41, the basic fuel injection amount TIM is set to the start-time basic fuel injection amount TIMSTX, followed by terminating the present calculation process.

Figure 16:
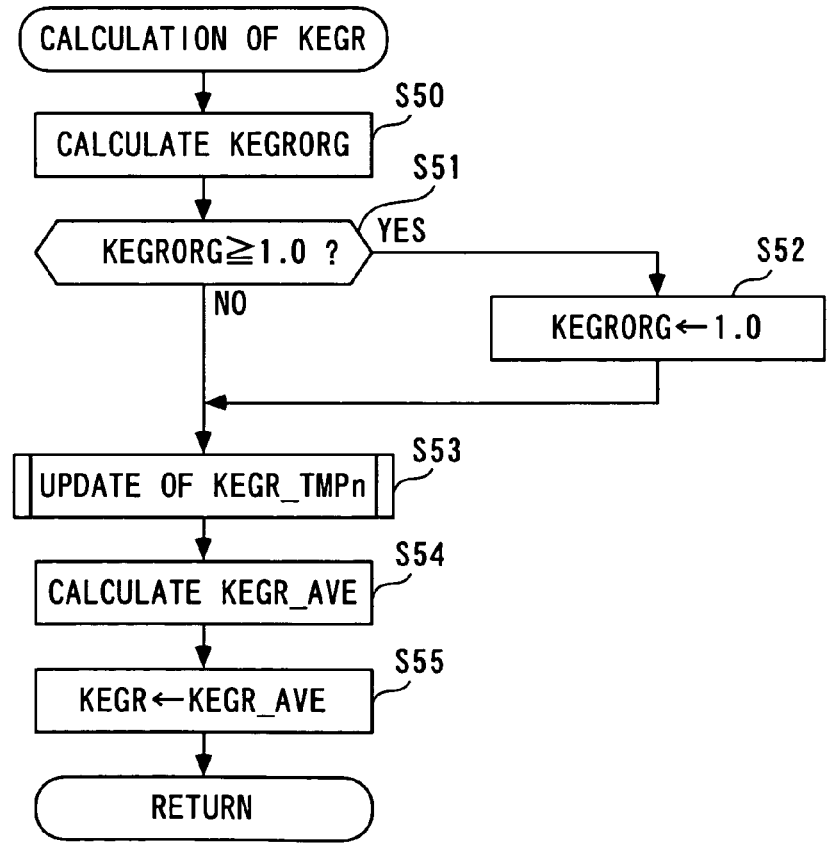
FIG. 16 is a flowchart of a process for calculating an actual fresh air ratio KEGR.

Referring again to FIG. 12, after the calculation of the basic fuel injection amount TIM in the step 11 is completed, the fuel injection control process proceeds to a step 12, wherein an actual fresh air ratio KEGR is calculated. The actual fresh air ratio KEGR corresponds to a ratio of fresh air drawn into the cylinder 3a to a total gas amount (fresh air amount+internal EGR amount+external EGR amount), and a value (1.0−KEGR) obtained by subtracting the actual fresh air ratio KEGR from a value of 1.0 corresponds to a ratio of a total recirculated gas amount (internal EGR amount+ external EGR amount) to the total gas amount, i.e. an EGR rate. That is, the actual fresh air ratio KEGR represents the EGR rate as well, and hence in the present embodiment, it corresponds to an EGR rate parameter. More specifically, the actual fresh air ratio KEGR is calculated as shown in FIG. 16.

First, in a step 50, the current value KEGRORG of the actual fresh air ratio KEGR is calculated by the following equation (1):

$$KEGRORG = \frac{TIMAFMX}{TIMBSX \cdot KTA} \qquad (1)$$

wherein KTA represents an intake temperature correction coefficient calculated by searching a map, not shown, according to the intake air temperature TA. As is apparent from the equation (1), the current value KEGRORG is basically calculated as a ratio of the first basic fuel injection amount TIMAFMX to the second basic fuel injection amount TIMBSX. As described hereinabove, the first basic fuel injection amount TIMAFMX corresponds to the amount of fresh air actually drawn into the cylinder 3a, while the second basic fuel injection amount TIMBSX corresponds to the amount of fresh air drawn into the cylinder 3a when the EGR control system is in a reference state in which the internal EGR amount and the external EGR amount are both controlled to 0. Therefore, the current value KEGRORG corresponds to the currently obtained actual fresh air ratio (fresh air amount/total gas amount).

Then, the KEGR calculation process proceeds to a step 51, wherein it is determined whether or not the current value KEGRORG is not smaller than a value of 1.0. If the answer to the question is negative (NO), the calculation process proceeds to a step 53, referred to hereinafter. On the other hand, if the answer to the question is affirmative (YES), the current value KEGRORG is set to 1.0 in a step 52, followed by the process proceeding to the step 53.

In the step 53 following the step 51 or 52, m buffer values KEGR_TMPn (n=1 to m (positive integer)) of the KEGRORG value stored in the RAM are updated. More specifically, each of the buffer values in the RAM is set to the immediately preceding value which is a value preceding by one control cycle in the fuel injection control (for example, the current value KEGR_TMP1 of the buffer values is shifted to the immediately preceding value KEGR_TMP2, and the value KEGR_TMP2 is shifted to the second preceding value KEGR_TMP3, and so forth), and the current value KEGRORG calculated in the step 51 or 52 is set to the current value KEGR_TMP1 of the buffer values.

Then, the calculation process proceeds to a step 54, wherein a moving average value KEGR_AVE of the buffer values KEGR_TMPn is calculated by the following equation (2):

$$KEGR\_AVE = \frac{1}{m} \cdot \sum_{n=1}^{m} KEGR\_TMPn \qquad (2)$$

Then, in a step 55, the actual fresh air ratio KEGR is set to the moving average value KEGR_AVE calculated in the step 54, followed by terminating the present calculation process.

Figure 17:
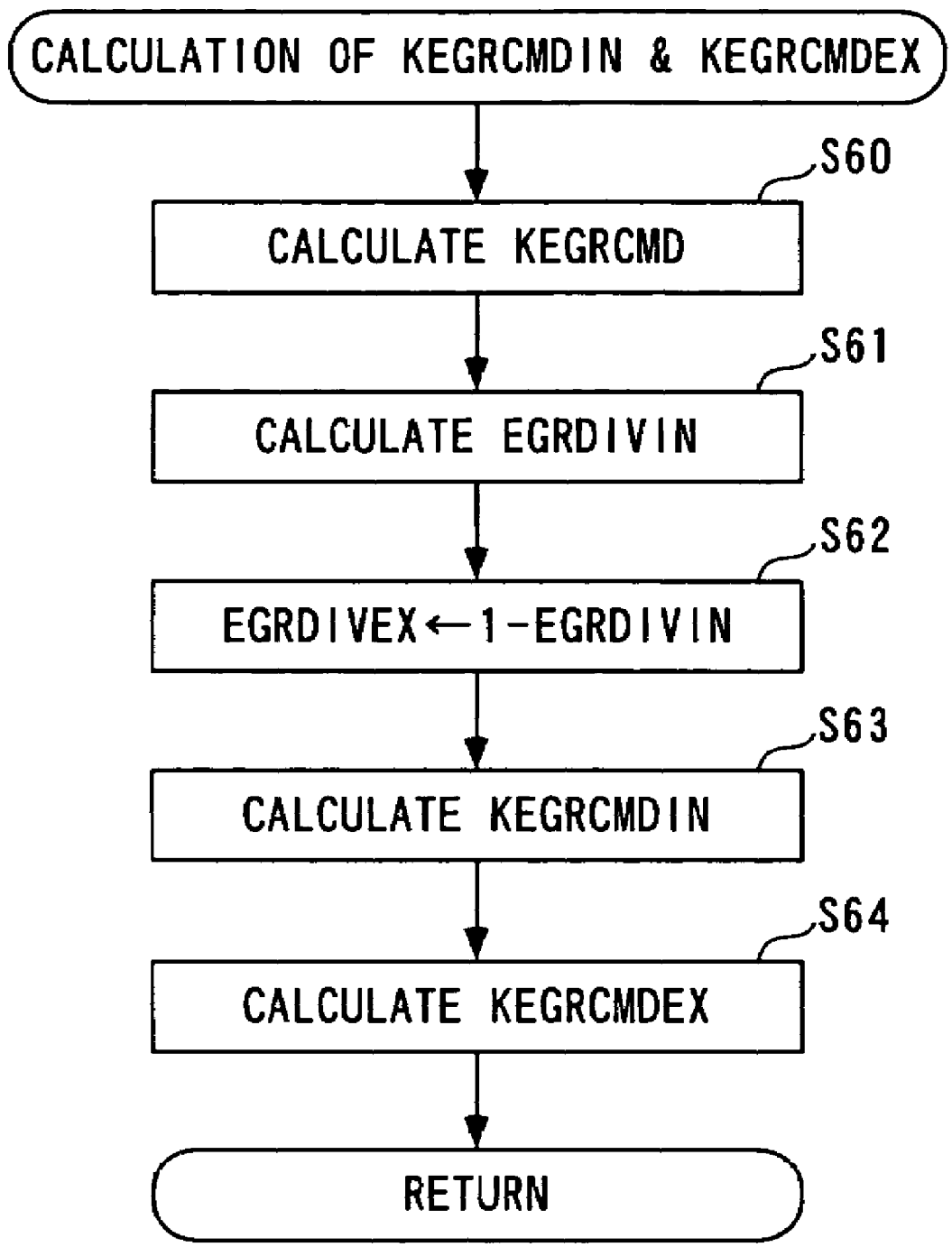
FIG. 17 is a flowchart of a process for calculating internal and external EGR target values KEGRCMDIN and KEGRCMDEX.

Referring again to FIG. 12, after calculating the actual fresh air ratio KEGR in the step 12, the fuel injection control process proceeds to a step 13, wherein an internal EGR target value KEGRCMDIN and an external EGR target value KEGRCMDEX are calculated. More specifically, the internal EGR target value KEGRCMDIN and the external EGR target value KEGRCMDEX are calculated as shown in FIG. 17.

First, in a step 60, a target value KEGRCMD of the actual fresh air ratio KEGR is calculated by searching a map shown in FIG. 18, according to the demanded torque PMCMD and the engine speed NE. In the present embodiment, the target value KEGRCMD of the actual fresh air ratio KEGR corresponds to the target value of the EGR rate parameter.

Then, the calculation process proceeds to a step 61, wherein an internal EGR ratio EGRDIVIN is calculated by searching a map shown in FIG. 19, according to the demanded torque PMCMD and the engine speed NE. Thereafter, in a step 62, an external EGR ratio EGRDIVEX is set to a value obtained by subtracting the internal EGR ratio EGRDIVIN from a value of 1. In the present embodiment, the internal EGR ratio EGRDIVIN corresponds to a ratio of a high-temperature gas amount to the total recirculated gas amount, and the external EGR ratio EGRDIVEX corresponds to a ratio of a low-temperature gas amount to the total recirculated gas amount.

Next, in a step 63, the internal EGR target value KEGRCMDIN is calculated based on the internal EGR ratio EGRDIVIN and the target value KEGRCMD by the following equation (3):

$$KEGRCMDIN = 1 - (1 - KEGRCMD) \cdot EGRDIVIN \qquad (3)$$

The internal EGR target value KEGRCMDIN corresponds to a value obtained by subtracting a target value of the ratio of the internal EGR amount to the total EGR amount from a value of 1. In other words, the internal EGR target value KEGRCMDIN represents a target value of the ratio of fresh air to be drawn into the cylinder 3a through control of the internal EGR amount, assuming that the external EGR amount is controlled to 0, and hence in this sense, corresponds to a target value of an internal EGR rate parameter representative of the ratio of the internal EGR amount to the total gas amount.

Then, in a step 64, the external EGR target value KEGRCMDEX is calculated based on the external EGR ratio EGRDIVEX and the target value KEGRCMD by the following equation (4), followed by terminating the present calculation process:

$$KEGRCMDEX=1-(1-KEGRCMD)\cdot EGRDIVEX \qquad (4)$$

The external EGR target value KEGRCMDEX corresponds to a value obtained by subtracting a target value of the ratio of the external EGR amount to the total EGR amount from a value of 1. In other words, the external EGR target value KEGRCMDEX represents a target value of the ratio of fresh air to be drawn into the cylinder 3a through control of the external EGR amount, assuming that the internal EGR amount is controlled to 0, and hence in this sense, corresponds to a target value of an external EGR rate parameter representative of the ratio of the external EGR amount to the total gas amount.

Referring again to FIG. 12, after calculating the two target values KEGRCMDIN and KEGRCMDEX in the step 13, the fuel injection control process proceeds to a step 14, wherein a target air-fuel ratio KCMD is calculated. More specifically, the target air-fuel ratio KCMD is calculated as shown in FIG. 20.

Figures 20, 21:
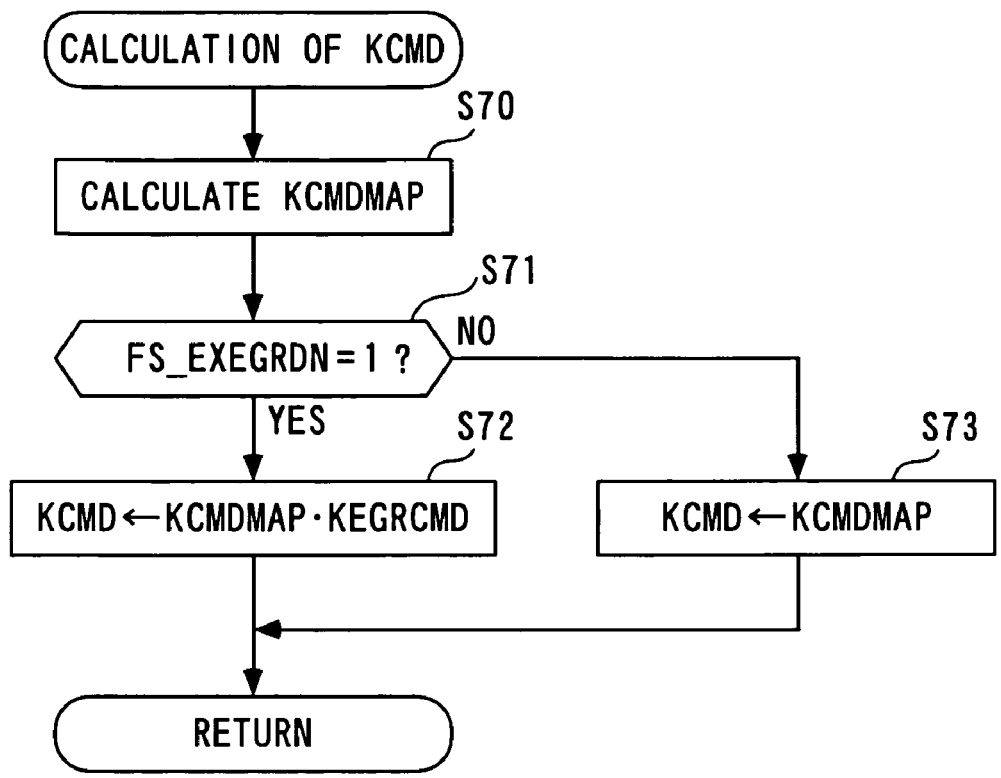
FIG. 20 is a flowchart of a process for calculating a target air fuel ratio KCMD.
FIG. 21 is a view of an example of a map for use in calculation of a target air-fuel ratio map value KCMDMAP.

First, in a step 70, a map value KCMDMAP of the target air-fuel ratio KCMD is calculated by searching a map shown in FIG. 21, according to the demanded torque PMCMD and the engine speed NE.

Then, the calculation process proceeds to a step 71, wherein it is determined whether or not a too small external EGR failure flag FS_EXEGRDN is equal to 1. If the answer to the question is affirmative (YES), i.e. if the external EGR amount is too small due to a failure of the EGR control valve 16b, the target air-fuel ratio KCMD is set to the product KCMDMAP·KEGRCMD of its map value and the target value of the actual fresh air ratio in a step 72, followed by terminating the present calculation process.

On the other hand, if the answer to the question of the step 71 is negative (NO), the calculation process proceeds to a step 73, wherein the target air-fuel ratio KCMD is set to the map value KCMDMAP, followed by terminating the present calculation process.

Referring again to FIG. 12, after calculating the target air-fuel ratio KCMD in the step 14, the fuel injection control process proceeds to a step 15, wherein an air-fuel ratio correction coefficient KAF is calculated. More specifically, the air-fuel ratio correction coefficient KAF is calculated as described below.

If conditions for executing air-fuel ratio feedback control are satisfied, the air-fuel ratio correction coefficient KAF is calculated with a predetermined feedback control algorithm (e.g. a PID control algorithm or a response-specifying control algorithm), not shown, such that the actual air-fuel ratio KACT is caused to converge to the target air-fuel ratio KCMD. On the other hand, if the conditions for executing air-fuel ratio feedback control are not satisfied, the air-fuel ratio correction coefficient KAF is set to a value of 1.

Then, the process proceeds to a step 16, wherein a total correction coefficient KTOTAL and a battery voltage correction term TIVB are calculated. The total correction coefficient KTOTAL is calculated by calculating various correction coefficients by searching respective associated maps according to operating parameters (e.g. the intake air temperature TA, the engine coolant temperature TW, the atmospheric pressure PA, etc.), and then multiplying the thus calculated correction coefficients by each other. The battery voltage correction term TIVB is calculated by searching a map, not shown, according to a battery voltage.

Then, in a step 17, the fuel injection amount TOUT is calculated based on the values calculated as above, by the following equation (5):

$$TOUT=TIM\cdot KEGR\cdot KCMD\cdot KAF\cdot KTOTAL+TIVB \qquad (5)$$

and then the present process is terminated. Thus, the fuel injection valve 10 is controlled to valve-opening timing and a valve open time period corresponding to the fuel injection amount TOUT.

Hereafter, the EGR control process will be described with reference to FIG. 22. In the present process, first, in a step 80, a process for calculating a feedback correction coefficient (hereinafter referred to as "the FB correction coefficient") KEGRFB is carried out. The FB correction coefficient KEGRFB converges the actual fresh air ratio KEGR to its target value KEGRCMD. In the step 80, not only the FB correction coefficient KEGRFB but also its internal EGR-associated learned value KEGRREFIN and its external EGR-associated learned value KEGRREFEX are calculated, as described in detail hereinafter. In the present embodiment, the FB correction coefficient KEGRFB corresponds to a feedback correction coefficient, and the internal EGR-associated learned value KEGRREFIN and the external EGR-associated learned value KEGRREFEX correspond to the learned value of a feedback correction value for the high-temperature gas and the learned value of a feedback correction value for the low-temperature gas, respectively.

Then, it is determined in a step 81 whether the aforementioned internal EGR ratio EGRDIVIN is not smaller than a value of 0.5. If the answer to the question is affirmative (YES), i.e. if the internal EGR amount is not smaller than the external EGR amount, the process proceeds to a step 82, wherein a value obtained by multiplying the internal EGR target value KEGRCMDIN obtained in the step 63 in FIG. 17 by the FB correction coefficient KEGRFB calculated in the step 80 is set to a corrected internal EGR rate KEGRMAPIN.

On the other hand, if the answer to the question of the step 81 is negative (NO), i.e. if the internal EGR amount is smaller than the external EGR amount, the process proceeds to a step 83, wherein a value obtained by multiplying the internal EGR target value KEGRCMDIN by the internal EGR-associated learned value KEGRREFIN of the FB correction coefficient is set to the corrected internal EGR rate KEGRMAPIN.

In a step 84 following the step 82 or 83, it is determined whether or not the intake lift flag F_VTEC is equal to 1. If the answer to the question is negative (NO), i.e. if the intake lift switching mechanism 41 has been set to the low-lift mode, the process proceeds to a step 85, wherein the target turning angle SAAEXCMD for the low-lift mode of the variable exhaust lift mechanism 70 is calculated by searching a map shown in FIG. 23, according to the corrected internal EGR rate KEGRMAPIN calculated in the step 82 or 83 and the engine speed NE. The target turning angle SAAEXCMD is used as a target value of the turning angle SAAEX of the control shaft 71, as described hereinafter.

Next, the process proceeds to a step 86, wherein the low-lift mode target exhaust cam phase CAEXCMD of the variable exhaust cam phase mechanism 90 is calculated by searching a map shown in FIG. 24, according to the corrected internal EGR rate KEGRMAPIN and the engine speed NE. The target exhaust cam phase CAEXCMD is used as a target value of the exhaust cam phase CAEX of the variable exhaust cam phase mechanism 90, as described hereinafter.

Then, in a step 87, the low-lift mode target intake cam phase CAINCMD of the variable intake cam phase mechanism 50 is calculated by searching a map shown in FIG. 25, according to the corrected internal EGR rate KEGRMAPIN and the engine speed NE. The target intake cam phase CAINCMD is used as a target value of the intake cam phase CAIN of the variable intake cam phase mechanism 50, as described hereinafter.

On the other hand, if the answer to the question of the step 84 is affirmative (YES), i.e. if the intake lift switching mechanism 41 has been set to the high-lift mode, the target turning angle SAAEXCMD, the target exhaust cam phase CAEXCMD, and the target intake cam phase CAINCMD for the high-lift mode are calculated in steps 88 to 90, respectively, by searching respective associated predetermined maps, not shown, according to the demanded torque PMCMD and the engine speed NE.

In a step 91 following the step 87 or 90, it is determined whether or not the external EGR ratio EGRDIVEX is larger than a value of 0.5. If the answer to the question is affirmative (YES), i.e. if the external EGR amount is larger than the internal EGR amount, the process proceeds to a step 92, wherein a value obtained by multiplying the external EGR target value KEGRCMDEX obtained in the step 64 in FIG. 17 by the FB correction coefficient KEGRFB is set to a corrected external EGR rate KEGRMAPEX.

On the other hand, if the answer to the question of the step 91 is negative (NO), i.e. if the external EGR amount is not larger than the internal EGR amount, the process proceeds to a step 93, wherein a value obtained by multiplying the external EGR target value KEGRCMDEX by the external EGR-associated learned value KEGRREFEX of the FB correction coefficient is set to the corrected external EGR rate KEGRMAPEX.

Then, in a step 94, the target EGR lift LCMD of the exhaust gas recirculation mechanism 16 is calculated by searching a map shown in FIG. 26, according to the corrected external EGR rate KEGRMAPEX calculated in the step 92 or 93 and an intake pipe gauge pressure HPBGA, followed by terminating the present process. The intake pipe gauge pressure HPBGA is calculated based on the intake pipe pressure PBA and the atmospheric pressure PA. The target EGR lift LCMD is used as a target value of the EGR lift LACT of the exhaust gas recirculation mechanism 16, as described hereinafter.

Figure 27:
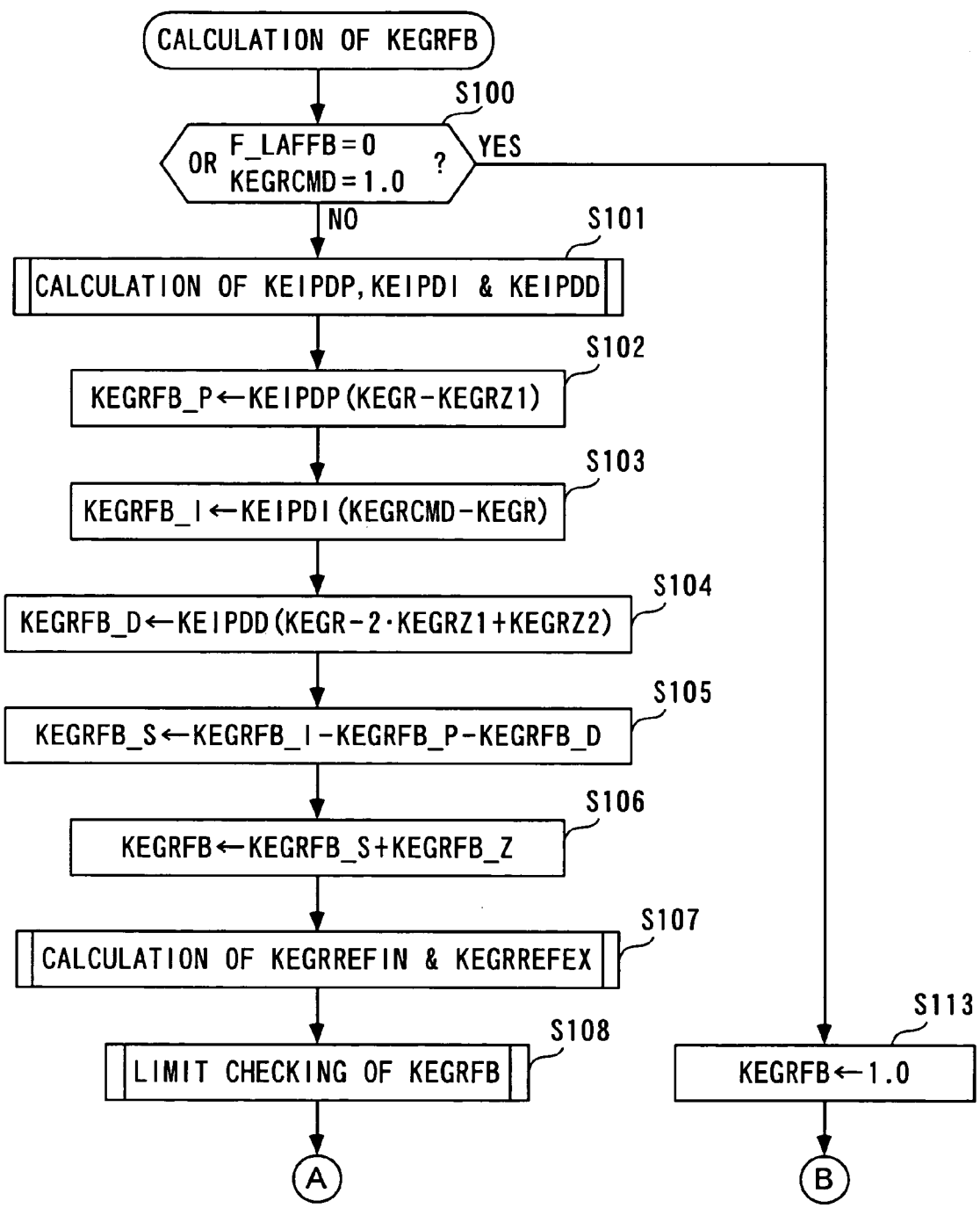
FIG. 27 is a flowchart of a process for calculating a feedback correction coefficient KEGRFB.
Figure 28:
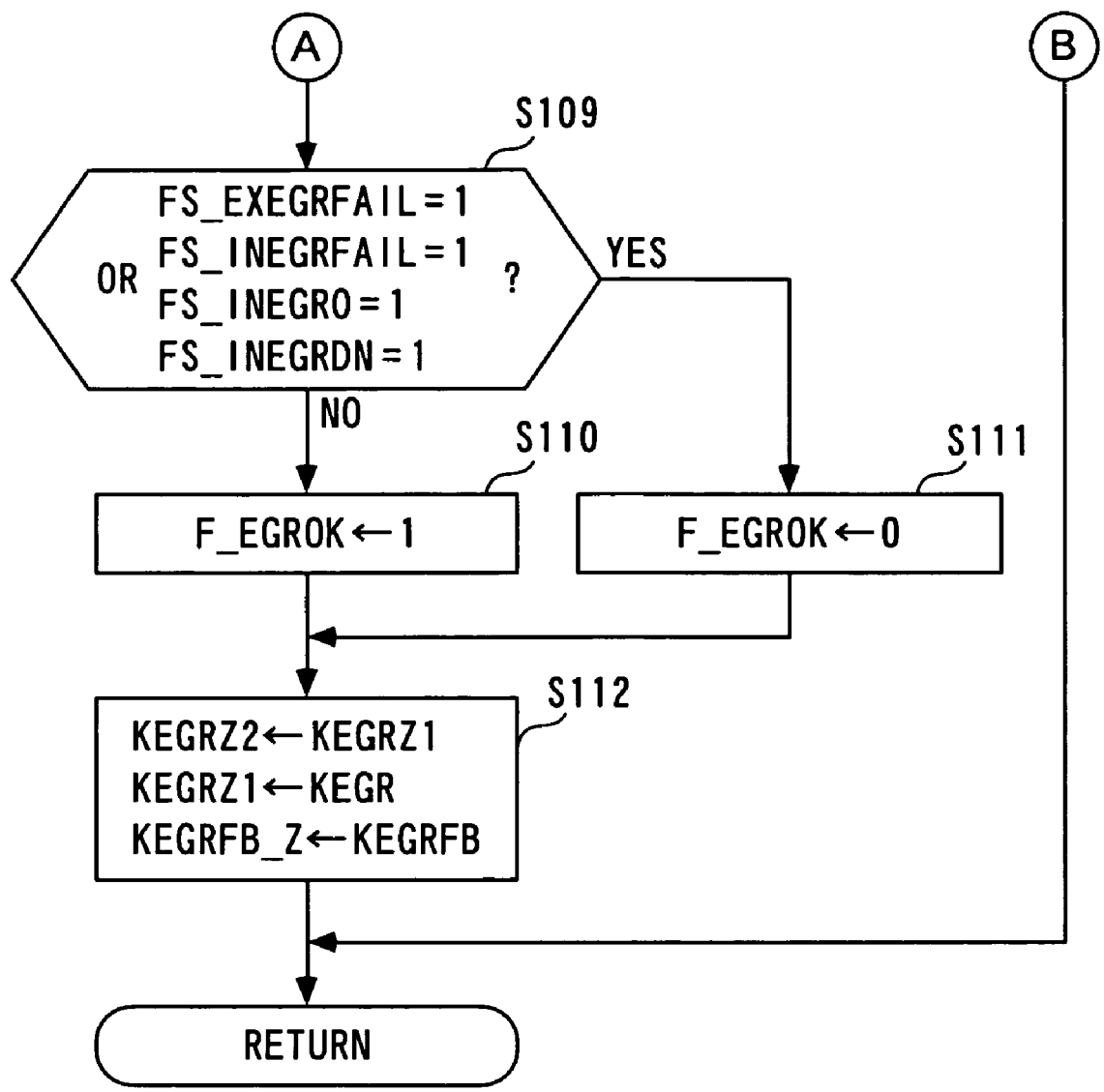
FIG. 28 is a flowchart of a continued part of FIG. 27.

Hereafter, the calculation process, referred to hereinbefore with reference to FIG. 22, for calculating the FB correction coefficient KEGRFB will be described with reference to FIGS. 27 and 28. In the present process, first, it is determined in a step 100 whether or not the condition of an air-fuel ratio feedback flag F_LAFFB being equal to 0 or the target value KEGRCMD of the actual fresh air ratio KEGR being equal to 1.0 is satisfied.

If the answer to the question is affirmative (YES), i.e. if F LAFFB=0 holds, which means that the air-fuel ratio feedback control based on the actual air-fuel ratio KACT detected by the LAF sensor 25 is not being executed, or if KEGRCMD=1.0 holds, which means that neither the internal EGR nor the external EGR is being performed, it is judged that the engine 3 is not in a region for carrying out feedback control of the actual fresh air ratio KEGR, so that the process proceeds to a step 113, wherein the FB correction coefficient KEGRFB is set to a value of 1.0, followed by terminating the present process.

On the other hand, if the answer to the question of the step 100 is negative (NO), i.e. if the air-fuel ratio feedback control is being carried out, and at least one of the internal EGR and the external EGR is being performed, the FB correction coefficient KEGRFB is calculated in the following steps 101 to 106, with an I-PD control algorithm.

First, in the step 101, a P-term gain KEIPDP, an I-term gain KEIPDI, and a D-term gain KEIPDD are calculated by searching respective associated maps, not shown, according to the engine speed NE and the demanded torque PMCMD.

Then, in the steps 102 to 104, a P term KEGRFB_P, an I term KEGRFB_I, and a D term KEGRFB_D are calculated by the following equations (6) to (8), using the P-term gain KEIPDP, the I-term gain KEIPDI, and the D-term gain KEIPDD calculated in the step 101, respectively:

$$KEGRFB\_P=KEIPDP(KEGR-KEGRZ1) \qquad (6)$$

$$KEGRFB\_I=KEIPDI(KEGRCMD-KEGR) \qquad (7)$$

$$KEGRFB\_D=KEIPDD(KEGR-2\cdot KEGRZ1+KEGRZ2) \qquad (8)$$

It should be noted that KEGRZ1 in the equations (6) and (8) represents the immediately preceding value of the FB correction coefficient, and KEGRZ2 in the equation (8) represents the second preceding value of the FB correction coefficient.

Next, in a step 105, an I-PD term KEGRFB_S is calculated by the following equation (9), using the P term KEGRFB_P, the I term KEGRFB_I, and the D term KEGRFB_D calculated in the steps 102 to 104:

$$KEGRFB\_S=KEGRFB\_I-KEGRFB\_P-KEGRFB\_D \qquad (9)$$

Then, in the step 106, the FB correction coefficient KEGRFB is calculated by adding the immediately preceding value KEGRFB_Z of the FB correction coefficient to the I-PD term KEGRFB_S.

Thereafter, in a step 107, the internal EGR-associated learned value KEGRREFIN and the external EGR-associated learned value KEGRREFEX are calculated, and in a step 108, limit checking of the FB correction coefficient KEGRFB is executed. These processes will be described in detail hereinafter.

Then, the process proceeds to a step 109 in FIG. 28, wherein it is determined whether or not any of an external EGR failure flag FS_EXEGRFAIL, a too large external EGR failure flag FS_EXEGRO, the too small external EGR failure flag FS_EXEGRDN, an internal EGR failure flag FS_INEGRFAIL, a too large internal EGR failure flag FS_INEGRO, and a too small internal EGR failure flag FS_INEGRDN, which are set as described hereinafter in processing carried out in the step 107 or 108, is equal to 1.

If the answer to the question is negative (NO), i.e. if the six flags are all equal to 0, it is judged that both the internal EGR and the external EGR are being normally performed, so that an EGR normality flag F_EGROK is set to 1 in a step 110 so as to indicate the fact.

On the other hand, if the answer to the question of the step 109 is affirmative (YES), i.e. if at least one of the six flags is equal to 1, it is judged that the internal EGR and/or the external EGR are/is not being normally performed, so that the EGR normality flag F_EGROK is set to 0 in a step 111 so as to indicate the fact.

In a step 112 following the step 110 or 111, the immediately preceding value KEGRZ1 of the actual fresh air ratio is shifted to the second preceding value KEGRZ2, the actual fresh air ratio KEGR to the immediately preceding value KEGRZ1 thereof, and the FB correction coefficient KEGRFB to the immediately preceding value KEGRFB_Z thereof, followed by terminating the present process.

Figure 29:
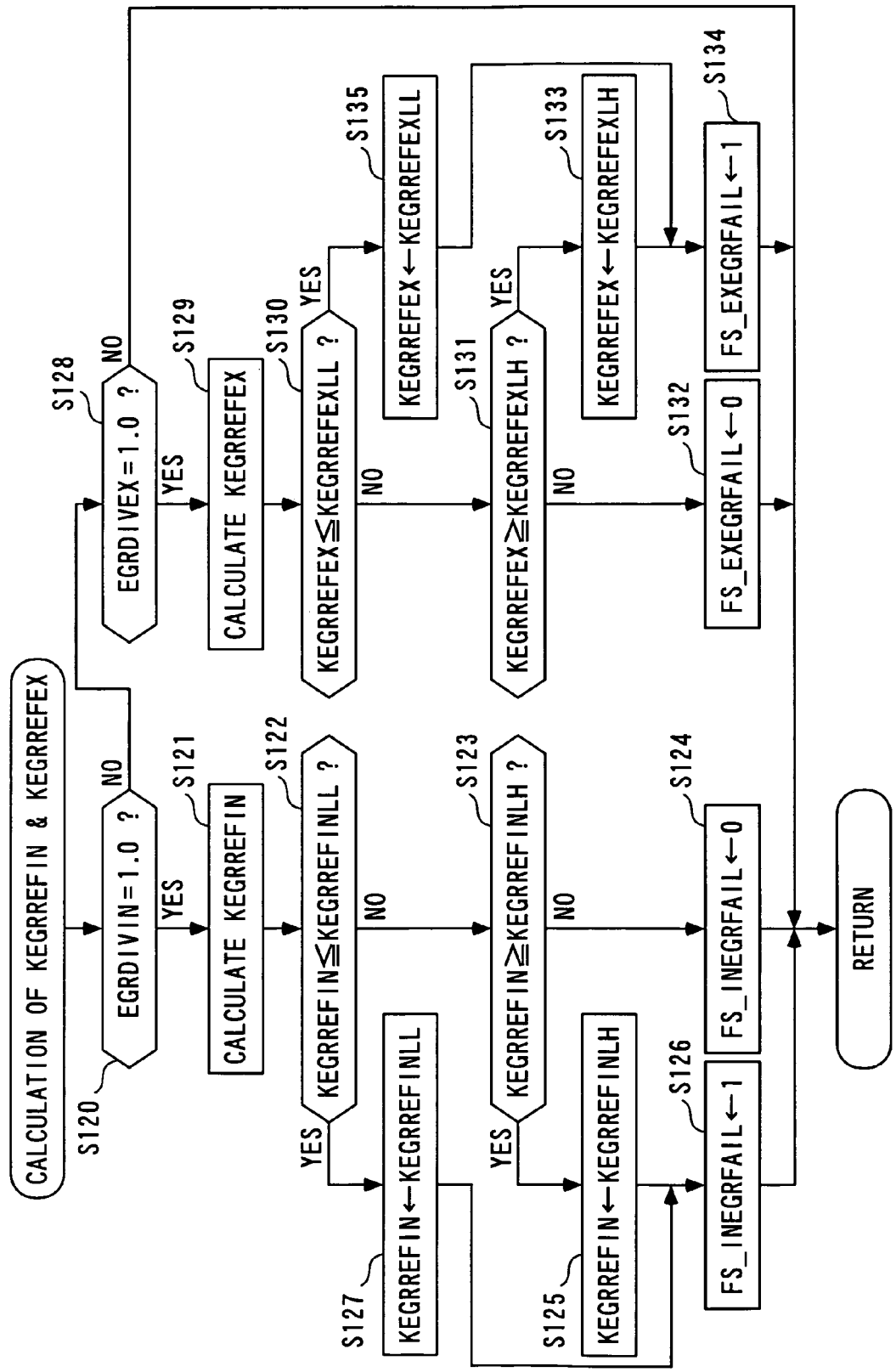
FIG. 29 is a flowchart of a process for calculating learned values KEGRREFIN and KEGRREFEX of internal and external EGRs.

Hereafter, the calculation process carried out in the step 107 in FIG. 27, described hereinabove, for calculating the internal EGR-associated learned value KEGRREFIN of the FB correction coefficient KEGRFB and the external EGR-associated learned value KEGRREFEX of the same will be described with reference to FIG. 29.

In the present process, first, it is determined in a step 120 whether or not the internal EGR ratio EGRDIVIN is equal to a value of 1.0 (second predetermined value). If the answer to the question is affirmative (YES), i.e. if only the internal EGR is being performed, the process proceeds to a step 121, wherein the internal EGR-associated learned value KEGRREFIN is calculated by weighted averaging expressed by the following equation (10):

$$KEGRREFIN = CREFEGRIN \cdot KEGRFB + (1 - CREFEGRIN) \cdot KEGRREFINZ \qquad (10)$$

wherein KEGRREFINZ represents the immediately preceding value of the internal EGR-associated learned value KEGRREFIN, and CREFEGRIN a predetermined weighting coefficient set between a value of 0 and a value of 1.0.

Then, in the following steps 122 to 127, limit checking of the internal EGR-associated learned value KEGRREFIN calculated in the step 121 is carried out. First, in the step 122, it is determined whether the internal EGR-associated learned value KEGRREFIN is not larger than a predetermined lower limit value KEGRREFINLL. If the answer to the question is negative (NO), the process proceeds to the step 123, wherein it is determined whether the internal EGR-associated learned value KEGRREFIN is not smaller than a predetermined upper limit value KEGRREFINLH.

If the answer to the question is negative (NO), i.e. if KEGRREFINLL<KEGRREFIN<KEGRREFINLH holds, it is judged that the internal EGR is being normally performed, and the internal EGR failure flag FS_INEGRFAIL is set to 0 in the step 124, followed by terminating the present process.

On the other hand, if the answer to the question of the step 123 is affirmative (YES), i.e. if KEGRREFIN ≧KEGRREFINLH holds, the internal EGR-associated learned value KEGRREFIN is set to the upper limit value KEGRREFINLH in the step 125.

Then, it is judged that the internal EGR is not being normally performed, so that in a step 126, the internal EGR failure flag FS_INEGRFAIL is set to 1 so as to indicate the fact, followed by terminating the present process.

On the other hand, if the answer to the question of the step 122 is affirmative (YES), i.e. if KEGRREFIN ≦KEGRREFINLL holds, the internal EGR-associated learned value KEGRREFIN is set to the lower limit value KEGRREFINLL in the step 127.

Then, it is judged that the internal EGR is not being normally performed, so that in the step 126, the internal EGR failure flag FS_INEGRFAIL is set to 1 so as to indicate the fact, followed by terminating the present process.

If the answer to the question of the step 120 is negative (NO), it is determined in a step 128 whether or not the external EGR ratio EGRDIVEX is equal to a value of 1.0 (first predetermined value). If the answer to the question is affirmative (YES), i.e. if only the external EGR is being performed, the process proceeds to a step 129, wherein the external EGR-associated learned value KEGRREFEX is calculated by weighted averaging expressed by the following equation (11):

$$KEGRREFEX = CREFEGREX \cdot KEGRFB + (1 - CREFEGREX) \cdot KEGRREFEXZ \qquad (11)$$

wherein KEGRREFEXZ represents the immediately preceding value of the external EGR-associated learned value KEGRREFEX, and CREFEGREX a predetermined weighting coefficient set between a value of 0 and a value of 1.0.

Then, in steps 130 to 135, limit checking of the external EGR-associated learned value KEGRREFEX is carried out in the same manner as in the steps 122 to 127. First, in the step 130, it is determined whether the external EGR-associated learned value KEGRREFEX is not larger than a predetermined lower limit value KEGRREFEXLL. If the answer to the question is negative (NO), the process proceeds to a step 131, wherein it is determined whether the external EGR-associated learned value KEGRREFEX is not smaller than a predetermined upper limit value KEGRREFEXLH.

If the answer to the question is negative (NO), i.e. if KEGRREFEXLL<KEGRREFEX<KEGRREFEXLH holds, it is judged that the external EGR is being normally performed, so that in a step 132, the external EGR failure flag FS_EXEGRFAIL is set to 0 so as to indicate the fact, followed by terminating the present process.

On the other hand, if the answer to the question of the step 131 is affirmative (YES), i.e. if KEGRREFEX ≧KEGRREFEXLH holds, the external EGR-associated learned value KEGRREFEX is set to the upper limit value KEGRREFEXLH in a step 133. Then, it is judged that the external EGR is not being normally performed, so that in a step 134, the external EGR failure flag FS_EXEGRFAIL is set to 1 so as to indicate the fact, followed by terminating the present process.

If the answer to the question of the step 130 is affirmative (YES), i.e. if KEGRREFEX≦KEGRREFEXLL holds, the external EGR-associated learned value KEGRREFEX is set to the lower limit value KEGRREFEXLL in the step 135. Then, it is judged that the external EGR is not being normally performed, so that in the step 134, the external EGR failure flag FS_EXEGRFAIL is set to 1 so as to indicate the fact, followed by terminating the present process.

If the answer to the question of the step 128 is negative (NO), i.e. if both the internal EGR and the external EGR are being performed, the process is immediately terminated. In short, in this case, neither the internal EGR-associated learned value KEGRREFIN nor the external EGR-associated learned value KEGRREFEX is calculated.

Figure 30:
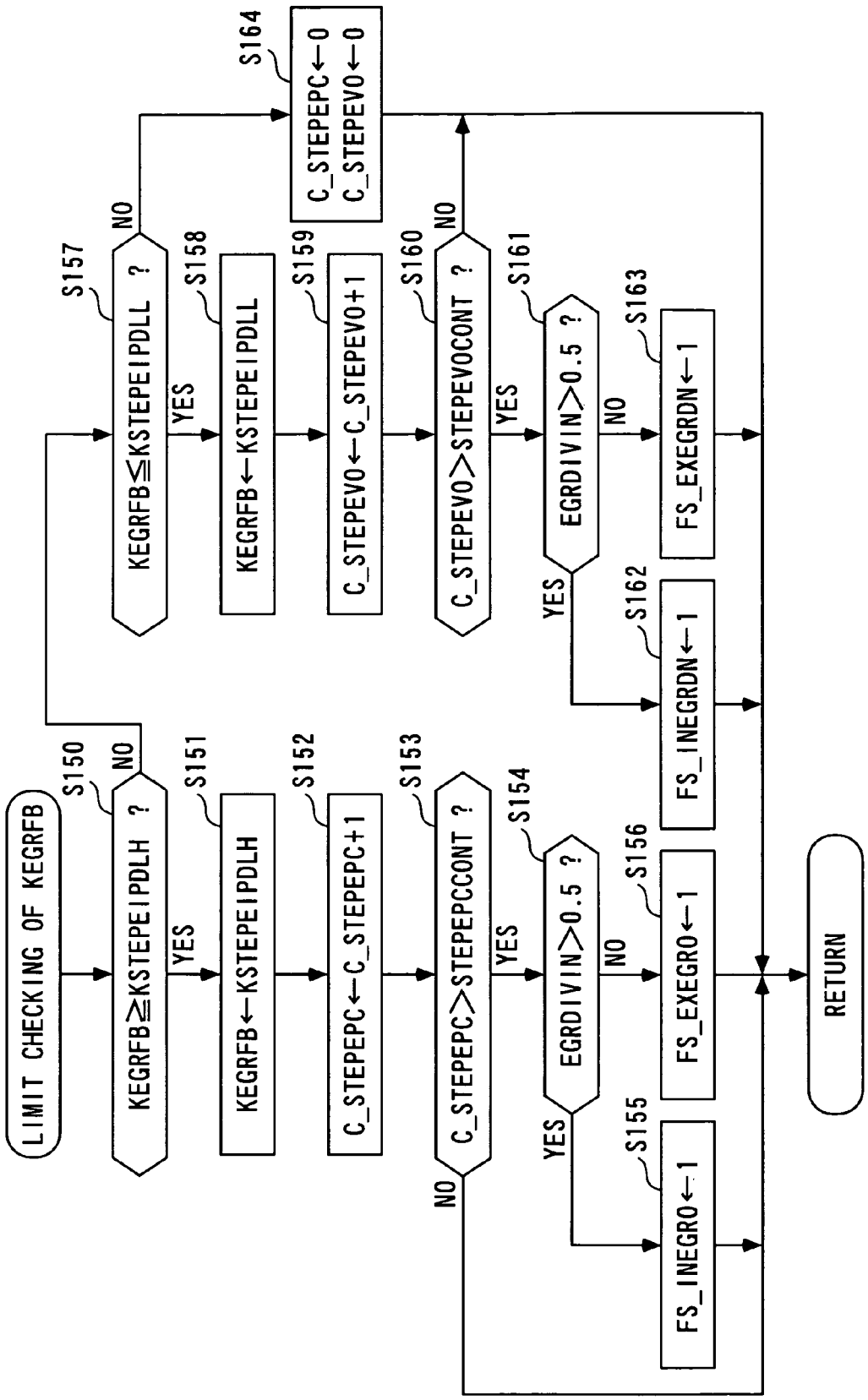
FIG. 30 is a flowchart of a limit-checking process for the feedback correction coefficient KEGRFB.

Hereafter, the process carried out in the step 108 in FIG. 27 for limit checking of the FB correction coefficient KEGRFB will be described with reference to FIG. 30. In the present process, first, it is determined in a step 150 whether or not the FB correction coefficient KEGRFB is not smaller than a predetermined upper limit value KSTEPEIPDLH. If the answer to the question is affirmative (YES), the process proceeds to a step 151, wherein the FB correction coefficient KEGRFB is set to the upper limit value KSTEPEIPDLH. Thereafter, in a step 152, a counter value C_STEPEPC for use in determining a too large EGR failure is incremented.

Then, the process proceeds to a step 153, wherein it is determined whether or not the counter value C_STEPEPC has exceeded a predetermined value STEPEPCCONT (e.g. 5). If the answer to the question is negative (NO), the present process is immediately terminated. On the other hand, if the answer to the question is affirmative (YES), i.e. if the number of times the FB correction coefficient KEGRFB calculated in the step 106 in FIG. 27 has become equal to or larger than the upper limit value KSTEPEIPDLH has exceeded a predetermined count, it is judged that the too large EGR failure has occurred in which the EGR amount is stuck at a too large state, so that the process proceeds to a step 154, wherein it is determined whether or not the internal EGR ratio EGRDIVIN is larger than 0.5.

If the answer to the question is affirmative (YES), i.e. if the internal EGR amount is larger than the external EGR amount, it is judged that the failure is on the internal EGR side, so that the process proceeds to a step 155, wherein the too large internal EGR failure flag FS_INEGRO is set to 1 so as to indicate the fact, followed by terminating the present process.

On the other hand, if the answer to the question of the step 154 is negative (NO), i.e. if the external EGR amount is not smaller than the internal EGR amount, it is judged that the failure is on the external EGR side, so that the process proceeds to a step 156, wherein the too large external EGR failure flag FS_EXEGRO is set to 1 so as to indicate the fact, followed by terminating the present process.

If the answer to the question of the step 150 is negative (NO), it is determined in a step 157 whether the FB correction coefficient KEGRFB is not larger than a predetermined lower limit value KSTEPEIPDLL. If the answer to the question is affirmative (YES), the process proceeds to a step 158, wherein the FB correction coefficient KEGRFB is set to the lower limit value KSTEPEIPDLL. Then, in a step 159, a counter value C_STEPEVO for use in determining a too small EGR failure is incremented.

Next, the process proceeds to a step 160, wherein it is determined whether or not the counter value C_STEPEVO has exceeded a predetermined value STEPEVOCONT (e.g. 5). If the answer to the question is negative (NO), the present process is immediately terminated. On the other hand, if the answer to the question is affirmative (YES), i.e. if the number of times the FB correction coefficient KEGRFB has become equal to or smaller than the lower limit value KSTEPEIPDLL has exceeded a predetermined count, it is judged that the too small EGR failure has occurred in which the EGR amount is stuck at a too small state, so that the process proceeds to a step 161, wherein it is determined whether or not the internal EGR ratio EGRDIVIN is larger than a value of 0.5.

If the answer to the question is affirmative (YES), i.e. if the internal EGR amount is larger than the external EGR amount, it is judged that the failure is on the internal EGR side, so that in a step 162, the too small internal EGR failure flag FS_INEGRDN is set to 1 so as to indicate the fact, followed by terminating the present process.

On the other hand, if the answer to the question of the step 161 is negative (NO), i.e. if the external EGR amount is not smaller than the internal EGR amount, it is judged that the failure is on the external EGR side, so that in a step 163, the too small external EGR failure flag FS_EXEGRDN is set to 1 so as to indicate the fact, followed by terminating the present process.

If the answer to the question of the step 157 is negative (NO), i.e. if KSTEPEIPDLL<KEGRFB<KSTEPEIPDLH holds, the counter value C_STEPEPC for use in determining the too large EGR failure and the counter value C_STEPEVO for use in determining the too small EGR failure are both reset to 0 in a step 164, followed by terminating the present process.

Figure 31:
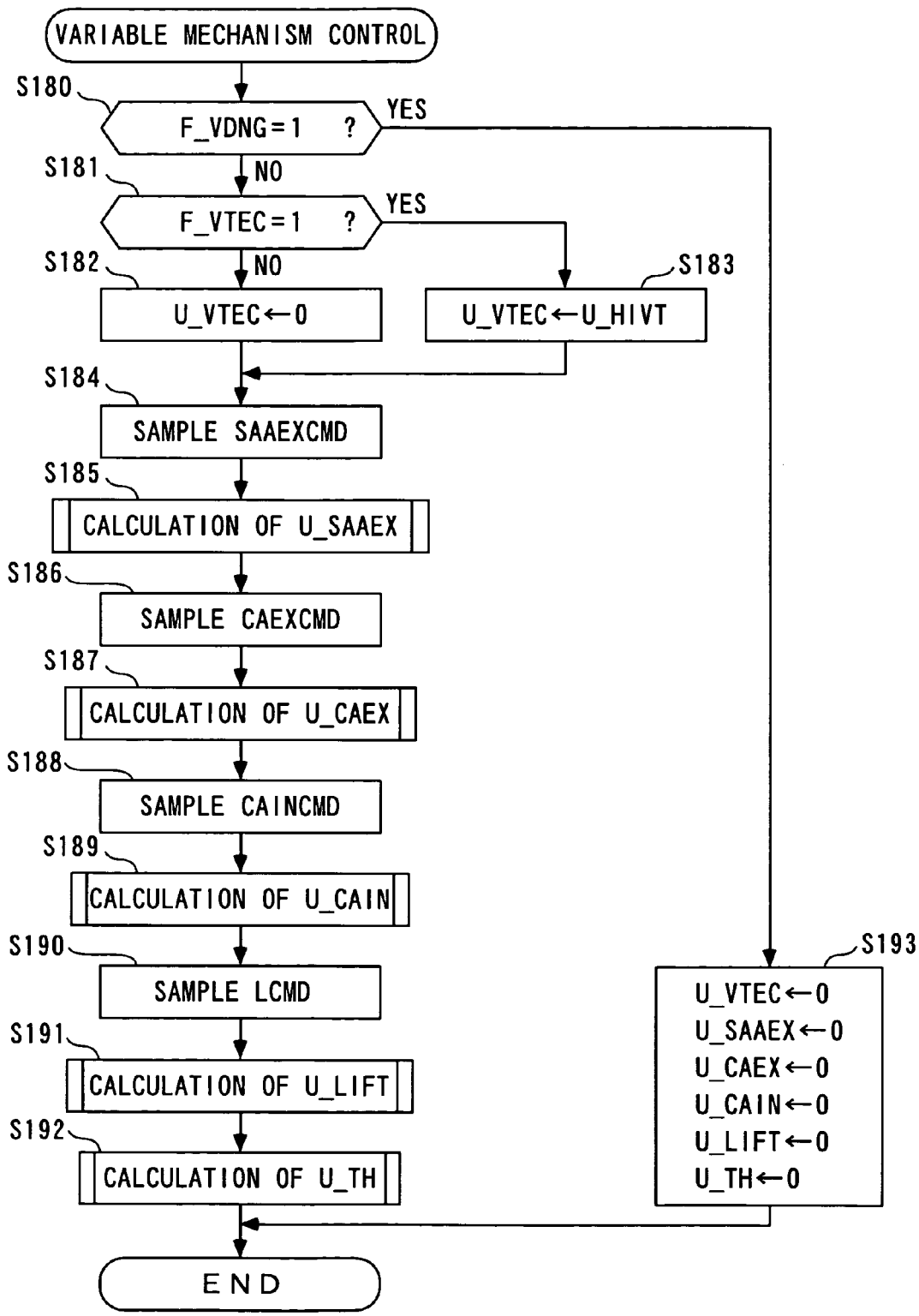
FIG. 31 is a flowchart of a process for controlling variable mechanisms.

Hereafter, a process for controlling the six variable mechanisms in the present embodiment, i.e. the throttle valve mechanism 13, the exhaust gas recirculation mechanism 16, the intake lift switching mechanism 41, the variable intake cam phase mechanism 50, the variable exhaust lift mechanism 70, and the variable exhaust cam phase mechanism 90 will be described with reference to FIG. 31. This process is specifically for calculating the six control inputs U_VTEC, U_SAAEX, U_CAEX, U_CAIN, U_LIFT, and U_TH for controlling the respective six variable mechanisms, as described below. The present process is carried out at intervals of a predetermined time period (e.g. 10 msec) set by a timer.

In the present process, first, it is determined in a step 180 whether or not a variable mechanism failure flag F_VDNG is equal to 1. The variable mechanism failure flag F_VDNG is set to 1 when it is determined, based on the values of the respective failure flags and the like, that at least one of the six variable mechanisms 13, 16, 41, 50, 70, and 90 is faulty.

If the answer to the question of the step 180 is negative (NO), i.e. if the variable mechanisms are all normal, the process proceeds to a step 181, wherein it is determined whether or not the intake lift flag F_VTEC is equal to 1. If the answer to the question is negative (NO), i.e. if the intake lift switching mechanism 41 has been set to the low-lift mode, the process proceeds to a step 182, wherein the intake lift control input U_VTEC is set to a value of 0.

On the other hand, if the answer to the question of the step 181 is affirmative (YES), i.e. if the intake lift switching mechanism 41 has been set to the high-lift mode, the process proceeds to a step 183, wherein the intake lift control input U_VTEC is set to a predetermined value U_HIVT for the high-lift mode.

Figure 22:
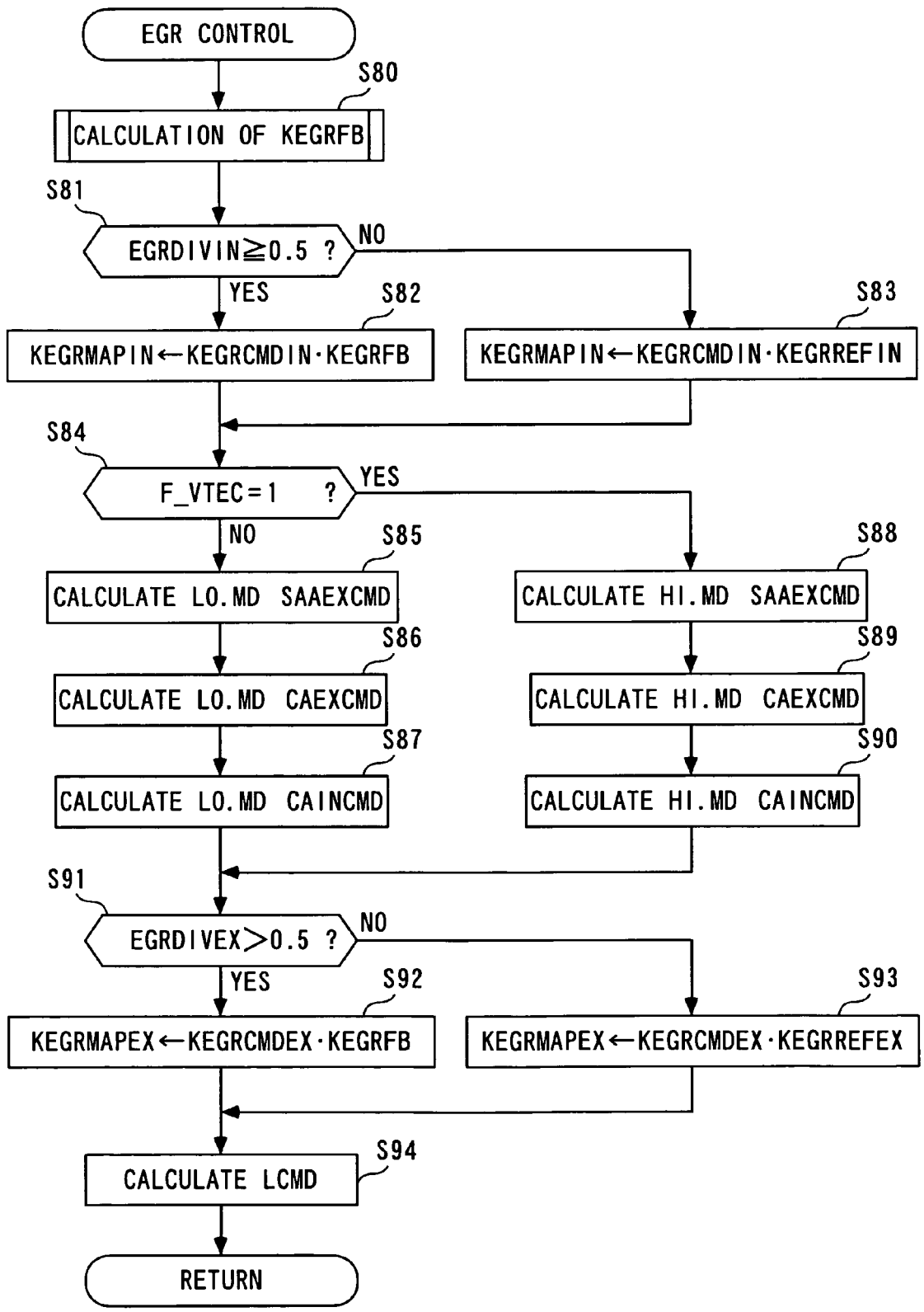
FIG. 22 is a flowchart of an EGR control process.

In a step 184 following the step 182 or 183, the target turning angle SAAEXCMD calculated in the step 85 or 88 in FIG. 22 is sampled. Thereafter, the process proceeds to a step 185, wherein an exhaust lift control input U_SAAEX for controlling the variable exhaust lift mechanism 70 is calculated based on the target turning angle SAAEXCMD and the turning angle SAAEX. More specifically, the exhaust lift control input U_SAAEX is calculated with a predetermined feedback control algorithm (e.g. a PID control algorithm or a response-specifying control algorithm) such that the turning angle SAAEX is caused to converge to the target turning angle SAAEXCMD.

Then, in a step 186, the target exhaust cam phase CAEXCMD calculated in the step 86 or 89 in FIG. 22 is sampled. Thereafter, the process proceeds to a step 187, wherein exhaust phase control input U_CAEX for controlling the variable exhaust cam phase mechanism 90 is calculated in the same manner as in the step 185. More specifically, the exhaust phase control input U_CAEX is calculated with a predetermined feedback control algorithm such that the exhaust cam phase CAEX is caused to converge to the target exhaust cam phase CAEXCMD.

In a step 188 following the step 187, the target intake cam phase CAINCMD calculated in the step 87 or 90 in FIG. 22 is sampled. Thereafter, the process proceeds to a step 189, wherein the intake phase control input U_CAIN for controlling the variable intake cam phase mechanism 50 is calculated in the same manner as in the step 185 or 187. More specifically, the intake phase control input U_CAIN is calculated with a predetermined feedback control algorithm such that the intake cam phase CAIN is caused to converge to the target intake cam phase CAINCMD.

Then, the process proceeds to a step 190, wherein the target EGR lift LCMD calculated in the step 94 in FIG. 22 is sampled. Thereafter, in a step 191, the EGR lift control input U_LIFT for controlling the exhaust gas recirculation mechanism 16 is calculated in the same manner as in the step 185, 187, or 189. More specifically, the EGR lift control input U_LIFT is calculated with a predetermined feedback control algorithm such that the EGR lift LACT is caused to converge to the target EGR lift LCMD.

Then, the process proceeds to a step 192, wherein the TH control input U_TH for controlling the throttle valve mechanism 13 is calculated in the same manner as in the step 185, 187, 189, or 191. More specifically, a target throttle valve opening THCMD is calculated by searching a map, not shown, according to the demanded torque PMCMD and the engine speed NE, and the TH control input U_TH is calculated with a predetermined feedback control algorithm such that the throttle valve opening TH is caused to converge to the target throttle valve opening THCMD. The TH control input U_TH is thus calculated in the step 192, followed by terminating the present process.

If the answer to the question of the step 180 is affirmative (YES), i.e. if at least one of the six variable mechanisms is faulty, the process proceeds to a step 193, wherein the six control inputs U_VTEC, U_SAAEX, U_CAEX, U_CAIN, U_LIFT, and U_TH are each set to 0, followed by terminating the present process. When all the six control inputs are thus set to 0, a predetermined intake air amount and a predetermined exhaust state are secured, whereby it is made possible not only to carry out idling or starting of the engine 3 during stoppage of the vehicle, but also to continue low-speed traveling during traveling of the vehicle.

Although in the above variable mechanism control process, the exhaust lift control input U_SAAEX is calculated in the step 185 with the feedback control algorithm, it may be calculated by searching a map according to the target turning angle SAAEXCMD. Further, the other control inputs U_CAEX, U_CAIN, U_LIFT, and U_TH may also be calculated in the same manner.

As described heretofore, according to the EGR control system 1 of the present embodiment, the internal EGR ratio EGRDIVIN is calculated based on the engine speed NE and the demanded torque PMCMD, and the external EGR ratio EGRDIVEX is calculated by subtracting the internal EGR ratio EGRDIVIN from 1. Then, when the internal EGR ratio EGRDIVIN is larger than the external EGR ratio EGRDIVEX, the three target values CAINCMD, SAAEXCMD, and CAEXCMD for controlling the variable intake cam phase mechanism 50, the variable exhaust lift mechanism 70, and the variable exhaust cam phase mechanism 90, respectively, are calculated based on the internal EGR ratio EGRDIVIN, the target value KEGRCMD, and the FB correction coefficient KEGRFB, whereby the internal EGR amount is feedback-controlled such that the actual fresh air ratio KEGR converges to its target value KEGRCMD. At the same time, the target EGR lift LCMD for controlling the exhaust gas recirculation mechanism 16 is calculated based on the external EGR ratio EGRDIVEX, the target value KEGRCMD, and the external EGR-associated learned value KEGRREFEX of the FB correction coefficient, whereby the external EGR amount is feedforward-controlled. The external EGR-associated learned value KEGRREFEX is calculated by weighted averaging, using the FB correction coefficient KEGRFB obtained when the internal EGR is in stoppage and only the external EGR is being performed.

On the other hand, inversely to the above, when the external EGR ratio EGRDIVEX is larger than the internal EGR ratio EGRDIVIN, the target EGR lift LCMD is calculated based on the external EGR ratio EGRDIVEX, the target value KEGRCMD, and the FB correction coefficient KEGRFB, whereby the external EGR amount is feedback-controlled such that the actual fresh air ratio KEGR converges to its target value KEGRCMD. At the same time, the three target values SAAEXCMD, CAEXCMD, and CAINCMD are calculated based on the internal EGR ratio EGRDIVIN, the target value KEGRCMD, and the internal EGR-associated learned value KEGRREFIN of the FB correction coefficient, whereby the internal EGR amount is feedforward-controlled. The internal EGR-associated learned value KEGRREFIN is calculated by weighted averaging, using the FB correction coefficient KEGRFB obtained when the external EGR is in stoppage and only the internal EGR is being performed.

The larger one of the internal EGR amount and the external EGR amount is thus feedback-controlled, and therefore it is possible to converge the actual fresh air ratio KEGR to its target value KEGRCMD. In other words, an actual total recirculated gas amount can be converged to a proper value. In addition, since the smaller one of the internal EGR amount and the external EGR amount is feedforward-controlled based on the learned value (KEGRREFIN or KEGRREFEX) associated therewith, and this learned value (KEGRREFIN or KEGRREFEX) for an EGR of which the ratio of the amount is determined to be smaller has been calculated by weighted averaging, using the FB correction coefficient KEGRFB obtained when only the EGR was being performed, it is possible to prevent the smaller EGR amount from assuming an improper value. This makes it possible to promptly converge the actual fresh air ratio KEGR to its target value KEGRCMD while preventing control of an EGR amount whose ratio is smaller from interfering with feedback control of the other EGR amount whose ratio is larger.

Further, the actual fresh air ratio KEGR, the target value KEGRCMD, the internal EGR ratio EGRDIVIN, and the external EGR ratio EGRDIVEX are each calculated based on the engine speed NE and the demanded torque PMCMD, so that even when an operating condition of the engine 3 changes, the internal EGR amount and the external EGR amount can be properly controlled according to the change in the operating condition.

For the above reasons, control accuracy in EGR control can be further improved compared with the conventional EGR control in which the low-temperature gas amount and the high-temperature gas amount are both duty-controlled, to thereby enhance accuracy in the control of in-cylinder temperature. As a result, fuel economy, drivability, and exhaust emission can be all improved. Further, the present embodiment can be applied to an engine, such as the compression ignition combustion engine 3 in the present embodiment, which requires highly accurate control of in-cylinder temperature.

Although in the above described embodiment, the variable intake cam phase mechanism 50, the variable exhaust lift mechanism 70, and the variable exhaust cam phase mechanism 90 for adjusting the internal EGR amount are used as a high-temperature gas recirculation device, this is not limitative, but the high-temperature gas recirculation device of the present invention may be any device insofar as it is capable of adjusting the amount of recirculation of higher-temperature exhaust gases than external EGR gases into a cylinder and is capable of adjusting the amount of combustion gases to be retained in the cylinder.

Although in the present embodiment, the I-PD control algorithm is used as a predetermined feedback control algorithm for calculating the feedback correction coefficient KEGRFB as the feedback correction value, this is not limitative, but other feedback control algorithms may be used. For example, a PID control algorithm and a response-specifying control algorithm (a sliding mode control algorithm or a back-stepping control algorithm) may be used.

Although in the present embodiment, a value of 1.0 is used as the first predetermined value for comparison with the external EGR ratio EGRDIVEX, this is not limitative, but the first predetermined value can be set to any value within a range larger than a value of 0.5 and smaller than a value of 1.0. Similarly, although a value of 1.0 is used as the second predetermined value for comparison with the internal EGR ratio EGRDIVIN, this is not limitative, but the second predetermined value can be set to any value within a range larger than a value of 0.5 and smaller than a value of 1.0.

Although in the present embodiment, the accelerator pedal opening AP, the engine speed NE, the fresh air flow rate GIN, the intake pipe pressure PBA, and so forth are used as the first operating condition parameter, this is not limitative, but any parameter indicative of an operating condition of the engine 3 may be used as the first operating condition parameter. For example, the engine coolant temperature may be used.

Further, although the accelerator pedal opening AP and the engine speed NE are used as second and third operating condition parameters, this is not limitative, but any parameter indicative of an operating condition of the engine 3 may be used as the second operating condition parameter or the third operating condition parameter. For example, the fresh intake air amount GAIRCYL and the intake pipe pressure PBA may be used as the second and third operating condition parameters.

Furthermore, although the actual fresh air ratio KEGR is used as the EGR rate parameter, this is not limitative, but any parameter indicative of the ratio of the total recirculated gas amount to the total gas amount may be used as the EGR rate parameter. For example, the EGR rate as a value obtained by subtracting the actual fresh air ratio KEGR from a value of 1 may be used as the EGR rate parameter.

According to the present embodiment, the internal EGR is controlled by changing the lift of the exhaust valves 7 by the variable exhaust lift mechanism 70. Therefore, as distinct from the conventional method of changing the valve overlap of the intake and exhaust valves by changing the intake and exhaust cam phases, it is possible to change the internal EGR amount largely by a relatively small amount of change in the lift of the exhaust valves 7. Further, since the lift of the exhaust valves 7 is directly and continuously changed by the control shaft 71 mechanically connected to the exhaust valves 7, it is possible to promptly and accurately control the internal EGR amount.

Further, according to the demanded torque PMCMD calculated according to the detected engine speed NE and accelerator pedal opening AP, and the engine speed NE, the internal EGR target value KEGRCMDIN as a target value of the internal EGR rate parameter representative of the ratio of the internal EGR amount to the total amount of gases present in the cylinder 3a is set (steps 60, 61, and 63). Further, the target turning angle SAAEXCMD of the control shaft 71 of the variable exhaust lift mechanism 70 is set according to the internal EGR target value KEGRCMDIN (steps 82, 83, and 85), and the turning angle SAAFX of the control shaft 71 of the variable exhaust lift mechanism 70 is controlled based on the target turning angle SAAEXCMD (steps 184 and 185). Therefore, it is possible to properly control the internal EGR amount depending on operating conditions of the engine 3. Further, since it becomes unnecessary to execute the conventional calculation of the valve overlap area, the computation load can be reduced.

Furthermore, the internal EGR amount is controlled not only by the aforementioned control of the lift of the exhaust valves 7 by the variable exhaust lift mechanism 70 but also by the control of opening and closing timings of the exhaust valves 7 by the variable exhaust cam phase mechanism 90. More specifically, the target exhaust cam phase CAEXCMD is set according to the internal EGR target value KEGRCMDIN (steps 82, 83, and 86), and the exhaust cam phase CAEX of the variable X exhaust cam phase mechanism 90 is controlled based on the set target exhaust cam phase CAEXCMD (steps 186 and 187). Thus, the concurrent use of the control of the opening and closing timings of the exhaust valves 7 by the variable exhaust cam phase mechanism 90 makes it possible to control the internal EGR amount in a fine-grained manner, whereby the internal EGR amount can be promptly and more accurately controlled. Further, the control range of the internal EGR amount can be expanded compared with the cases where only the variable exhaust lift mechanism 70 is controlled, whereby it is possible to increase the internal EGR amount as required.

Furthermore, in addition to the control of the lift of the exhaust valves 7 by the variable exhaust lift mechanism 70 and the control of the opening and closing timings of the exhaust valves 7 by the variable exhaust cam phase mechanism 90, the opening and closing timings of the intake valves 4 is controlled by the variable intake cam phase mechanism 50, for control of the internal EGR amount. More specifically, the target intake cam phase CAINCMD is set according to the internal EGR target value KEGRCMDIN (steps 82, 83 and 87), and the intake cam phase CAIN of the variable intake cam phase mechanism 50 is controlled according to the set target intake cam phase CAINCMD (steps 188 and 189). Thus, by further concurrently using the control of the opening and closing timings of the intake valves 4 by the variable intake cam phase mechanism 50, it is possible to make up for shortage of the internal EGR amount to thereby secure a required internal EGR amount. Further, it is possible to perform finer-grained control of the internal EGR amount, and thereby more accurately control the same.

Further, although in the present embodiment, as the target value of the internal EGR rate parameter, there is employed the internal EGR target value KEGRCMDIN as a target value of the ratio of the fresh air amount to the total gas amount of gases in the cylinder 3a during execution of the internal EGR, it is to be understood that instead of the internal EGR target value KEGRCMDIN, it is possible to use a target value of the ratio of the internal EGR amount to the total gas amount.

According to the present embodiment, the first basic fuel injection amount TIMAFMX corresponding to the amount of fresh air actually drawn into the cylinder 3a is calculated based on the fresh air flow rate GIN detected by the air flow sensor 22 (step 31), and at the same time, the second basic fuel injection amount TIMBSX corresponding to the amount of fresh air estimated to be drawn into the cylinder 3a when the EGR control system is in a reference state in which the both the internal EGR amount and the external EGR amount are both controlled to 0 is calculated based on the engine speed NE and the intake pipe pressure PBA (step 37). Then, the ratio of the first basic fuel injection amount TIMAFMX to the second basic fuel injection amount TIMBSX is determined as the current value KFGRORG of the actual fresh air ratio KEGR (step 50, and the equation (1)). Based on the current value KEGRORG, the actual fresh air ratio KEGR (actual EGR rate=1.0−KEGR) as a parameter representative of the EGR rate is finally calculated. Therefore, as distinct from the conventional EGR control systems using an oxygen concentration sensor provided in the intake pipe, it is possible to accurately calculate the actual EGR rate even when the EGR rate is low, without providing a dedicated device for determining the EGR rate.

Further, based on the engine speed NE and the demanded torque PMCMD, the target value KEGRCMD of the actual fresh air ratio KEGR is set (step 60), and the feedback correction coefficient KEGRFB is calculated such that the actual fresh air ratio KEGR becomes equal to the target value KEGRCMD (step 80). Further, the internal EGR ratio EGRDIVIN and the external EGR ratio EGRDIVEX are determined according to the demanded torque PMCMD and the engine speed NE (steps 61 and 62), and the internal EGR target value KEGRCMDIN and the external EGR target value KEGRCMDEX are set based on these ratios and the target value KEGRCMD (steps 63 and 64).

Then, based on the feedback correction coefficient KEGRFB, the internal EGR target value KEGRCMDIN, and the external EGR target value KEGRCMDEX, the target turning angle SAAEXCMD of the variable exhaust lift mechanism 70, the target exhaust cam phase CAEXCMD of the variable exhaust cam phase mechanism 90, the target intake cam phase CAINCMD of the variable intake cam phase mechanism 50, and the target EGR lift LCMD of the exhaust recirculation mechanism 16 are set (FIG. 22). Therefore, using the actual fresh air ratio KEGR accurately calculated, the internal EGR and the external EGR can be accurately controlled such that the actual EGR rate becomes equal to its target value, whereby the EGR control can be properly performed by the internal EGR and the external EGR.

Further, although in the present embodiment, the actual fresh air ratio KEGR is calculated as the EGR rate parameter, it is to be understood that the actual EGR rate may be calculated. Further, although in the present embodiment, the first basic fuel injection amount TIMAFMX and the second basic fuel injection amount TIMBSX are calculated as respective values corresponding to the first and second fresh intake air amounts, this is not limitative, but the fresh intake air amount GAIRCYL may be used as the first fresh intake air amount, and an intake air amount corresponding thereto may be determined as the second fresh intake air amount. Then, based on these amounts, the actual fresh air ratio KEGR or the actual EGR rate may be calculated.

Furthermore, although in the present embodiment, the feedback correction coefficient KEGRFB is calculated with the I-PD control algorithm, it is to be understood that a suitable feedback control algorithm other than this may be used.

The present invention is not limited to the above-described embodiment, but can be practiced in various forms. For example, although in the present embodiment, the control of the external EGR by the exhaust recirculation mechanism 16 is performed in combination with the control of the internal EGR by the variable exhaust lift mechanism 70, the variable exhaust cam phase mechanism 90, and the variable intake cam phase mechanism 50, by way of example, the present invention encompasses the omission of the control of the external EGR, and further the omission of the variable exhaust cam phase mechanism 90 and/or the variable intake cam phase mechanism 50. Further, the variable exhaust lift mechanism 70 is not limited to the illustrated type used in the present embodiment, but any desired type may be employed insofar as it is capable of changing the lift of the exhaust valves.

It is further understood by those skilled in the art that the foregoing are preferred embodiments of the invention, and that various changes and modifications may be made without departing from the spirit and scope thereof.

What is claimed is:

1. An EGR control system for an internal combustion engine including at least one cylinder, comprising:
   a low-temperature gas recirculation device that recirculates exhaust gases emitted from the cylinder into the cylinder, as a low-temperature gas, and is capable of changing a recirculation amount of the low-temperature gas;
   a high-temperature gas recirculation device that executes at least one of an operation for causing combustion gases generated in the cylinder to remain in the cylinder as a high-temperature gas higher in temperature than the low-temperature gas and an operation for recirculating the high-temperature gas into the cylinder, as an operation for recirculating the high-temperature gas, and is capable of changing a recirculation amount of the high-temperature gas;
   EGR rate parameter-calculating means for calculating an EGR rate parameter indicative of a ratio of a total recirculated gas amount which is a sum of respective amounts of the low-temperature gas and the high-temperature gas which are recirculated into the cylinder, to a total gas amount which is a sum of the total recirculated gas amount and an amount of fresh air drawn into the cylinder, according to a first operating condition parameter indicative of an operating condition of the engine;
   target value-setting means for setting a target value of the EGR rate parameter according to a second operating condition parameter indicative of an operating condition of the engine;
   feedback correction value-calculating means for calculating a feedback correction value for causing the EGR rate parameter to converge to the set target value, with a predetermined feedback control algorithm;
   gas amount ratio-setting means for setting a ratio of an amount of the low-temperature gas to be recirculated by said low-temperature gas recirculation device to the total recirculated gas amount, and a ratio of an amount of the high-temperature gas to be recirculated by said high-temperature gas-recirculation device to the total recirculated gas amount, according to a third operating condition parameter indicative of an operation condition of the engine; and
   control means for controlling one of said low-temperature gas recirculation device and said high-temperature gas recirculation device, which recirculates one of the low-temperature gas and the high-temperature gas, of which the set ratio of the amount is larger, according to a larger one of the set ratio of the amount of the low-temperature gas and the set ratio of the amount of the high-temperature gas, and the feedback correction value.

2. An EGR control system as claimed claim 1, further comprising learned value-calculating means for calculating a learned value of the feedback correction value for the low-temperature gas, when the ratio of the amount of the low-temperature gas is larger than that of the amount of the high-temperature gas and at the same time not smaller than a first predetermined value, and a learned value of the feedback correction value for the high-temperature gas, when the ratio of the amount of the high-temperature gas is larger than that of the amount of the low-temperature gas and at the same time not smaller than a second predetermined value, and wherein said control means controls the other of said low-temperature gas recirculation device and said high-temperature gas recirculation device, according to the other of the ratio of the amount of the low-temperature gas and that of the amount of the high-temperature gas, and the learned value for the other gas.

3. An EGR control system for an internal combustion engine including at least one cylinder and at least one exhaust valve associated therewith, the EGR control system controlling internal EGR in which combustion gases generated by combustion are caused to remain in the cylinder, comprising:
a variable exhaust lift mechanism that is provided with an actuator mechanically connected to the exhaust valve, and is capable of continuously changing lift of the exhaust valve by changing an operation amount of said actuator;
operating condition-detecting means for detecting an operating condition of the engine;
internal EGR target value-setting means for setting a target value of an internal EGR rate parameter indicative of a ratio of an amount of internal EGR to a total amount of gases existing in the cylinder, as an internal EGR target value, depending on the detected operating condition of the engine;
target operation amount-setting means for setting a target operation amount of said actuator, according to the set internal EGR target value; and
EGR control means for controlling the internal EGR by controlling said variable exhaust lift mechanism, based on the set target operation amount.

4. An EGR control system as claimed in claim 3, wherein the engine includes an exhaust cam for driving the exhaust valve, and a crankshaft,
the EGR control system further comprising:
a variable exhaust cam phase mechanism that is capable of changing opening and closing timings of the exhaust valve by changing an exhaust cam phase as a phase of the exhaust cam with respect to the crankshaft; and
target exhaust cam phase-setting means for setting a target exhaust cam phase according to the internal EGR target value, and
wherein said EGR control means controls the internal EGR not only by controlling said variable exhaust lift mechanism, but also by controlling said variable exhaust cam phase mechanism based on the set target exhaust cam phase.

5. An EGR control system as claimed in claim 3, wherein the engine includes at least one intake valve associated with the at least one cylinder, an intake cam for driving the exhaust valve, and a crankshaft,
the EGR control system further comprising:
a variable intake cam phase mechanism that is capable of changing opening and closing timings of the intake valve by changing an intake cam phase as a phase of the intake cam with respect to the crankshaft; and
target intake cam phase-setting means for setting a target intake cam phase according to the internal EGR target value, and
wherein said EGR control means controls the internal EGR not only by controlling said variable exhaust lift mechanism, but also by controlling said variable intake cam phase mechanism based on the set target intake cam phase.

6. An EGR control system for an internal combustion engine including an intake pipe, at least one cylinder, at least one exhaust valve associated therewith, and a variable exhaust lift mechanism for changing lift of the exhaust valve, the EGR control system controlling internal EGR in which combustion gases are caused to remain in the cylinder, by changing the lift of the exhaust valve by the variable exhaust lift mechanism, comprising:
a fresh air flow rate sensor provided in the intake pipe, for detecting a flow rate of fresh air flowing through the intake pipe;
first fresh intake air amount-calculating means for calculating an amount of fresh intake air drawn into the cylinder, based on the detected flow rate of fresh air, as a first fresh intake air amount;
rotational speed-detecting means for detecting rotational speed of the engine;
intake pipe pressure-detecting means for detecting pressure in the intake pipe;
second fresh intake air amount-calculating means for calculating an amount of fresh air estimated to be drawn into the cylinder, based on the detected rotational speed of the engine and the detected intake pipe pressure, as a second fresh intake air amount, when the variable exhaust lift mechanism is in a reference state controlling the lift of the exhaust valve to a predetermined reference lift; and
EGR rate parameter-calculating means for calculating an EGR rate parameter indicative of an EGR rate which is a ratio of an internal EGR amount to a total amount of gases existing in the cylinder, based on the calculated first and second fresh intake air amounts.

7. An EGR control system as claimed in claim 6, further comprising:
demanded torque-determining means for determining torque demanded of the engine;
target value-setting means for setting a target value of the EGR rate parameter, based on the rotational speed of the engine and the determined demanded torque;
correction coefficient-calculating means for calculating a correction coefficient such that the EGR rate parameter becomes equal to the target value; and
EGR control means for controlling the variable exhaust lift mechanism, based on the calculated correction coefficient.

8. An EGR control system as claimed in claim 7, wherein the engine includes an exhaust recirculation mechanism that controls external EGR in which part of exhaust gases exhausted from the cylinder is recirculated to a portion of the intake pipe downstream of said fresh air flow rate sensor,
wherein said second fresh intake air amount-calculating means calculates an amount of fresh intake air estimated to be drawn into the cylinder when the variable exhaust lift mechanism is in the reference state and at the same time the exhaust recirculation mechanism is in a stopped state in which the external EGR is stopped, as the second fresh intake air amount, based on the rotational speed of the engine and the intake pipe pressure, and
wherein said EGR rate parameter-calculating means calculates an EGR rate parameter indicative of an EGR rate which is a ratio of a sum of the internal EGR amount and an external EGR amount to the total amount of gases existing in the cylinder, as the EGR rate parameter, based on the first and second fresh intake air amounts.

* * * * *